United States Patent
Herdendorf et al.

(10) Patent No.: US 7,505,860 B2
(45) Date of Patent: Mar. 17, 2009

(54) ALIGNMENT OF UNMOUNTED HEAD GIMBAL ASSEMBLIES FOR TESTING

(75) Inventors: Brett Robert Herdendorf, Mound, MN (US); Michael Steven Quam, Morgan Hill, CA (US); Justin Lee Holwell, Sterling, MA (US); Andrew Michael Blair, New Market, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 18 days.

(21) Appl. No.: 11/700,635

(22) Filed: Jan. 31, 2007

(65) Prior Publication Data

US 2007/0136022 A1 Jun. 14, 2007

Related U.S. Application Data

(62) Division of application No. 11/056,337, filed on Feb. 11, 2005.

(60) Provisional application No. 60/544,040, filed on Feb. 12, 2004.

(51) Int. Cl.
*G01R 35/00* (2006.01)
*G01L 25/00* (2006.01)
*G06F 19/00* (2006.01)

(52) U.S. Cl. .................. 702/108; 29/603.03; 29/603.04; 29/603.06; 360/59; 360/137; 360/245.7; 702/115

(58) Field of Classification Search .................. 702/57, 702/108, 115; 29/603.3, 603.4, 603.6, 603.9; 360/137, 245.7, 59; 324/158.1, 210, 212, 324/261; 439/65, 66
See application file for complete search history.

(56) References Cited

U.S. PATENT DOCUMENTS

| | | | |
|---|---|---|---|
| 2,971,179 A | 2/1961 | Heuer | |
| 4,468,074 A | 8/1984 | Gordon | |
| 4,520,555 A * | 6/1985 | Gyi et al. | ................. 29/603.06 |
| 4,645,280 A | 2/1987 | Gordon et al. | |
| 4,766,371 A | 8/1988 | Moriya | |
| 5,198,945 A | 3/1993 | Blaeser et al. | |
| 5,496,182 A | 3/1996 | Yasumura | |
| 5,675,082 A | 10/1997 | Marr et al. | |
| 5,682,780 A | 11/1997 | Girard | |
| 5,786,677 A | 7/1998 | Marr | |
| 5,844,420 A | 12/1998 | Weber et al. | |
| 5,896,735 A | 4/1999 | Wirtz | |
| 5,913,687 A | 6/1999 | Rathburn | |
| 5,938,451 A | 8/1999 | Rathburn | |
| 6,034,851 A * | 3/2000 | Zarouri et al. | ............... 360/137 |

(Continued)

OTHER PUBLICATIONS

Genetec Technology Berhad, "Auto Shunt Machine—Automatic HGA Shunting System," http://genetec.net/machine/Shunting.htm, printed Jan. 7, 2005.

(Continued)

*Primary Examiner*—John H Le
(74) *Attorney, Agent, or Firm*—Shumaker & Sieffert, P.A.

(57) ABSTRACT

A method for dynamic electrical testing of head gimbal assemblies may include initiating an automated continuous process that includes selecting an unmounted head gimbal assembly; aligning the unmounted head gimbal assembly; loading the unmounted head gimbal assembly to a disc; and testing the unmounted head gimbal assembly.

14 Claims, 25 Drawing Sheets

U.S. PATENT DOCUMENTS

| | | | |
|---|---|---|---|
| 6,125,003 A | 9/2000 | Tsuda et al. | |
| 6,132,554 A | 10/2000 | Traise et al. | |
| 6,135,783 A | 10/2000 | Rathburn | |
| 6,140,661 A | 10/2000 | Nodelman | |
| 6,163,950 A * | 12/2000 | Bodiker et al. | 29/559 |
| 6,178,629 B1 | 1/2001 | Rathburn | |
| 6,229,303 B1 | 5/2001 | Guzik | |
| 6,229,304 B1 | 5/2001 | Guzik | |
| 6,231,353 B1 | 5/2001 | Rathburn | |
| 6,242,910 B1 | 6/2001 | Guzik et al. | |
| 6,247,938 B1 | 6/2001 | Rathburn | |
| 6,255,750 B1 | 7/2001 | Mohajerani et al. | |
| 6,307,467 B1 | 10/2001 | Starkey et al. | |
| 6,378,195 B1 | 4/2002 | Carlson | |
| 6,459,260 B1 | 10/2002 | Bonin et al. | |
| 6,483,670 B1 | 11/2002 | Watanabe | |
| 6,487,028 B1 | 11/2002 | Sri-Jayantha et al. | |
| 6,512,367 B2 | 1/2003 | Liu et al. | |
| 6,566,870 B2 | 5/2003 | Sorenson et al. | |
| 6,572,396 B1 | 6/2003 | Rathburn | |
| 6,580,572 B1 | 6/2003 | Yao et al. | |
| 6,704,165 B2 | 3/2004 | Kube et al. | |
| 6,717,776 B2 | 4/2004 | Boutaghou | |
| 6,789,659 B2 | 9/2004 | Spejna et al. | |
| 6,801,387 B1 | 10/2004 | Rahman | |
| 6,830,460 B1 | 12/2004 | Rathburn | |
| 6,939,143 B2 | 9/2005 | Rathburn | |
| 6,957,963 B2 | 10/2005 | Rathburn | |
| 7,084,654 B2 | 8/2006 | Zhao et al. | |
| 7,094,718 B2 | 8/2006 | Kwon et al. | |
| 7,121,839 B2 | 10/2006 | Rathburn | |
| 7,127,799 B2 | 10/2006 | Girard et al. | |
| 7,141,969 B2 | 11/2006 | Guzik | |
| 7,159,299 B1 * | 1/2007 | McMunigal et al. | 29/603.03 |
| 7,345,840 B2 * | 3/2008 | Gomez et al. | 360/59 |
| 7,379,265 B2 | 5/2008 | Wang et al. | |
| 2002/0039253 A1 | 4/2002 | Imai et al. | |
| 2002/0053590 A1 | 5/2002 | Lennard et al. | |
| 2002/0069510 A1 * | 6/2002 | Girard et al. | 29/603.04 |
| 2002/0075602 A1 * | 6/2002 | Mangold et al. | 360/245.7 |
| 2003/0107839 A1 | 6/2003 | Smith | |
| 2003/0179493 A1 | 9/2003 | Kim | |
| 2003/0182788 A1 | 10/2003 | Fayeulle et al. | |
| 2004/0213138 A1 | 10/2004 | Kim | |
| 2005/0028353 A1 | 2/2005 | Kidachi et al. | |
| 2005/0099763 A1 | 5/2005 | Rathburn | |
| 2005/0101164 A1 | 5/2005 | Rathburn | |
| 2005/0209797 A1 | 9/2005 | Anderson et al. | |
| 2005/0233609 A1 | 10/2005 | Rathburn | |
| 2006/0006895 A1 | 1/2006 | Zhao et al. | |
| 2006/0033249 A1 | 2/2006 | Guzik et al. | |
| 2006/0035483 A1 | 2/2006 | Rathburn et al. | |
| 2006/0116004 A1 | 6/2006 | Rathburn | |
| 2006/0160379 A1 | 7/2006 | Rathburn | |
| 2007/0115593 A1 | 5/2007 | Yao | |

OTHER PUBLICATIONS

Joseph Ogando, "Intelligent Fasteners," Design News, Oct. 20, 2003, pp. 56-57, designnews.com.

* cited by examiner

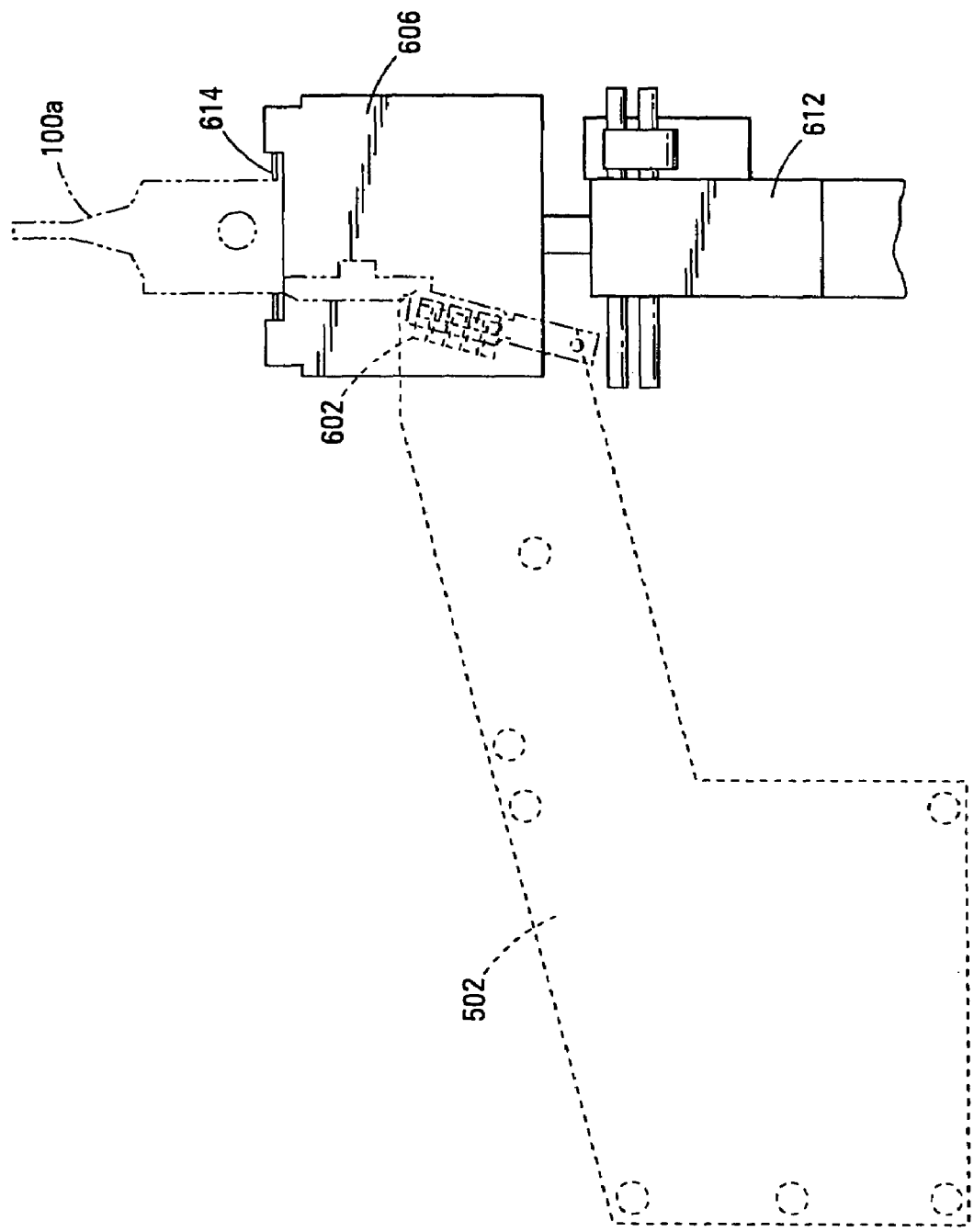

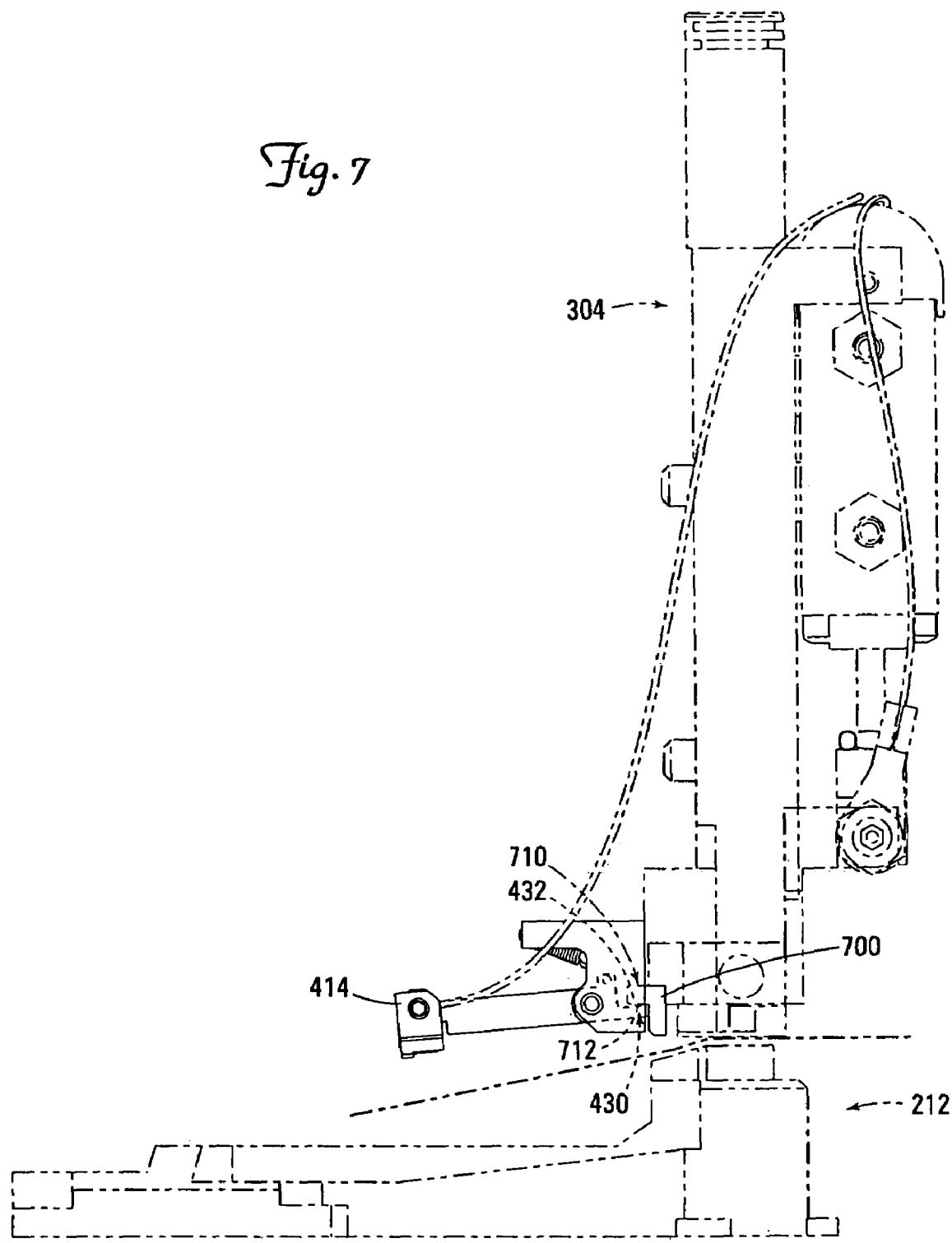

ALIGNMENT OF UNMOUNTED HEAD GIMBAL ASSEMBLIES FOR TESTING

This application is a Divisional of U.S. patent application Ser. No. 11/056,337, filed Feb. 11, 2005, which claims the benefit of U.S. Provisional Application No. 60/544,040, filed Feb. 12, 2004, the entire contents of which are incorporated herein by reference.

TECHNICAL FIELD

The invention relates to methods and apparatus for manipulating, retaining and electrically testing small parts, typically small electronic components. More particularly, the invention relates to methods and apparatus for testing head gimbal assemblies used in computer disc drives.

BACKGROUND

Prior to attaching a head gimbal assembly (HGA) into a hard disc drive, it is desirable to dynamically test the functionality of the read and write transducers that reside on the head gimbal assembly so that defective HGAs may be identified and sorted. Such testing can include preliminary activities to align, configure, and prepare the HGA for testing, followed by the actual electrical test of the HGA. Because HGAs are typically small, fragile, and contain sensitive electronic components, they are susceptible to mechanical stress, electrostatic discharge (ESD), environmental contamination, and other handling-related issues.

To avoid these handling-related issues, current systems mount the HGA on an intermediate mounting fixture that supports the HGA throughout the testing process. An operator may manually place an HGA into an alignment tool that sets the orientation of the HGA to an intermediate mounting fixture. The alignment of the HGA to the intermediate mounting fixture is important because it helps determine the orientation of the HGA with respect to a disc during dynamic electrical testing. After alignment, a head set operation is performed in which the HGA and the intermediate mounting fixture are manually passed through a magnetic field to properly set the direction of the magnetic domains of the read and write transducers inside the head of the HGA.

Initially, the HGA's read and write transducers are electrically shorted together with a shunt tab, which resides on a flex circuit of the HGA and protects the HGA from ESD damage by ensuring that the components are held at a common voltage potential. This shunt tab must be broken or removed prior to testing the HGA. In current systems, the shunt tab is manually broken or cut off before the HGA is loaded into the electrical tester. After its removal, the HGA becomes extremely sensitive to ESD damage. Positioning the flex circuit for removal of the shunt tab is challenging because the flex circuit is flexible, and its position can vary over a relatively wide area. Additionally, flex circuits may have an inherent bend or twist, further complicating flex circuit positioning. In current systems, the intermediate mounting fixtures have positioning pins to precisely locate the flex circuit for de-shunting.

When the HGA is ready for electrical test, an operator can manually pick the HGA from a tray by grasping the intermediate mounting fixture and loading the HGA onto a dynamic electrical tester. During the dynamic electrical test procedure, the HGA's flex circuit makes interconnect with the dynamic electrical tester's preamplifier, the HGA is loaded to a test disc, and the read and write transducers on the HGA are tested. Using this method of HGA manipulation and electrical testing requires a new intermediate mounting fixture to be designed and fabricated for each new HGA type. The intermediate mounting fixture generally consists of a clamping mechanism to hold the HGA base plate, a set of pins to locate the HGA flex circuit for interconnect, and a set of holes and pins to locate the intermediate mounting fixture at the various operations, including dynamic electrical test.

The clamping mechanism of the intermediate mounting fixture that holds the HGA base plate during electrical test has several requirements. As the bit density in disc drives increases, in operation the drive heads must fly lower with respect to the disc. This requires tighter tolerances for the HGA's orientation. Errors in the orientation influence Roll Static Attitude (RSA) and Pitch Static Attitude (PSA), which affect the HGA's ability to load to the disc and its fly characteristics after loading. RSA and PSA are effectively the head's static orientation relative to the disc. To ensure that the HGA's performance is consistent for both electrical testing and operation of the drive after installation, it is important the HGA be similarly constrained during both functions.

During operation of the drive, it is optimal for the HGA's base plate to be pulled down with approximately three-to-seven pounds of force relative to a reference surface and fastened by swaging a boss hole in the HGA to a rotary arm in the drive. In the past, the HGA's base plate has been held by attaching the HGA to an intermediate mounting fixture and then placing the intermediate mounting fixture on the tester. This may require manually screwing the HGA to the intermediate mounting fixture before placing it on the tester. While this is an accurate method of mounting and provides the needed downward force, it is very labor intensive and adds an extra amount of error contributed by the fixture to the testing process.

Another method of attaching the base plate to an intermediate mounting fixture involves using a flexure clamp jaw that clamps the HGA's boss hole. While this is less labor intensive than manually screwing the HGA in place, it still requires extensive manual handling of the part. It also does not provide any downward force, which leaves the base plate unconstrained and not flat. This negatively affects the test results.

Still another method includes mounting the HGA to an intermediate mounting fixture that holds the HGA by pinching it with a clamp between the back of the base plate and a pin through a swage hole present in the HGA. This method also does not provide sufficient downward force, but forces the back edge of the base plate to align to the clamp. Because the back edge of the base plate is not a controlled edge, this may cause misalignment during the testing process.

All of the above-described methods are difficult to automate and have costs associated with loading, purchasing, and maintaining the extra fixtures on which the HGAs are mounted. The intermediate mounting fixtures also create a larger mass and require an additional mechanical interface, both of which create another potential source of error or vibration during the dynamic electric test.

In current systems, pins on the intermediate mounting fixture align the interconnection pads on the HGA's flex circuit with the dynamic electric tester's preamplifier contacts so that interconnection between the two is achieved. This alignment is necessary because the flex circuit is flexible, which permits the location of the interconnection pads to vary over a relatively wide area. After the flex circuit is constrained for interconnection, the intermediate mounting fixture, which holds the HGA, is loaded onto the tester.

The set of holes and pins used to align the intermediate mounting fixture for testing the HGA affects Reader Writer Offset (RWO), which is an important measurement in the dynamic electrical test. RWO is the distance a read/write head jogs to read a track that it has just written. The RWO is a function of the skew angle of the head, which is the angle of the head relative to the center of the disc on the x-y plane, the reader-to-writer separation distance, and the reader-to-writer alignment on the head. Because RWO data is used to verify that the reader-to-writer separation and alignment are within the tolerance limits of the process controls, the process of loading the HGA to disc should be carefully controlled so that the position of the HGA's skew angle is both accurate and repeatable.

Challenges to accurately loading an HGA to a disc include maintaining the HGA's orientation precisely from the moment it is put on the load mechanism until it is loaded to the disc. Also, one must ensure that the structure stiffness of the load mechanism does not contribute to positional error during test. Additionally, the process of loading the HGA must be carefully controlled to prevent damage to the HGA. For instance, the HGA cannot be bent significantly beyond its normal operating state. It also must be presented to the disc at a shallow enough angle to prevent any features from unintentionally contacting the disc during loading.

The cost effectiveness of the loader is not only measured in direct hardware costs due to damaged parts, but also in its cost effectiveness on the testing process. For instance, costs associated with the loader include the down time for the tester when there are changes in product configuration. Another cost includes the cost of testing media, which is one of the greatest costs in HGA testing. HGAs can crash a disc for several reasons during test including contamination of the media, non-optimal load orientation of the HGA, and HGAs with extreme or out-of-specification roll or pitch values.

Currently, load mechanisms typically include vertical translating stages, ramp loads, or tilt mechanisms. The vertical translating stage maintains the base plate of the HGA parallel to the disc and lifts the HGA to the disc. New generations of HGAs have features on the load beam beyond the head that contact the disc before the head and can damage the disc. This can result in a limited number of loads before the HGA or media are crashed. The ramp load mechanism works well in the drive, but it is difficult to use in the testing process. The ramp is typically fixed in location at the perimeter of the disc, which limits the loading of the HGA to only one radius. Once that radius is crashed, that disc must be discarded. Ramp loading also can result in damage to the HGA from the sliding action across the ramp if the appropriate materials or surface finish are not used. However, use of the ramp enables loading the HGA to the disc at a shallower angle.

The third and often used loading method utilizes a tilting mechanism. A stage pivots, lowering the HGA below the surface of the disc. Once the HGA is moved into position under the disc surface, the HGA is pivoted up to the disc surface. One of the challenges of this mechanism is where to locate the hinge. The ideal location of the pivot point is near the bend in the HGA. The hinge, however, needs to be in real space and cannot inhibit positioning the HGA at various places on the disc. Miniaturized loaders with small pivot bearings have been used, but it is difficult to achieve the required structural stiffness and maintain all the tight tolerance required with a small structure and still provide room to access the HGA with an electrical interconnection. Though the HGA can be loaded at an angle shallower than the vertical load, it does not sufficiently reduce stresses to the HGA during load.

Once the HGA's head is loaded to the disc, there are still many sources of positional disturbance that can affect the effective track density during testing. For instance, disc flutter is a result of exciting a disc at the disc's natural resonant frequencies. Internal and external sources, such as spindle motor vibrations or external air turbulence and acoustic vibrations, may create vibrations that excite a disc and create disc flutter. The flutter is primarily a vertical modulation of the disc while the disc is rotating. The modulation creates bends in the disc. The compliance in the HGA load beam allows the head to follow undulations of the disk, but because the base plate of the HGA is held fixed relative to an external reference there may be a small error. This error is significant at current and higher track densities. The radial motion contributes to the total asynchronous runout, which exists when position errors are asynchronous, or do not repeat on each disc revolution.

Some current systems use devices between the spindle motor and the disc to reduce flutter. In these systems, one must test the HGA's head on the disc side that is opposite of these devices. Common approaches either require testing the top surface of the disc, which necessitates that the spindle protrude down into the test stand, or inverting the spindle that holds the disc so that the testing can be performed on the bottom surface of the disc. Both approaches have disadvantages. Systems that test the top surface are at a disadvantage from a part handling standpoint because testing on the bottom surface is considered more compatible with how the HGA is presented to the HGA tester. Additionally, placing a disc on the spindle is more difficult in current systems that test the top surface because of the close proximity of the flutter reduction device to the seated disc. Current testers may need extra mechanisms, such as guide fingers, to guide the disc to its final position. Current systems that test the bottom surface of the disc also have disadvantages because they typically invert the spindle, which creates a number of structure challenges in order to maintain the required rigidity and access for disc changes and other service needs.

During dynamic electrical testing, the intermediate HGA mounting fixture also has a large effect on the test and the test results. The intermediate mounting fixture can add to the stack-up tolerance related to the HGA's z-height causing small shifts in fly height. By increasing the mass that the tester micro-positioner must move while testing, the presence of the intermediate mounting fixture can lead to lower dynamic electrical tester track per inch (TPI) capability. The size of the intermediate mounting fixture also can limit the radii and skew locations that the HGA is loaded onto and unloaded from the disc. By limiting the load radii and skew options, the tester may use more media and take more time to load the HGA, which decreases the number of HGAs tested in a given period of time.

SUMMARY

In one aspect, the invention is a computer-controlled, automated method and apparatus for loading, aligning, and testing an HGA that is not mounted on an intermediate mounting fixture (referred to herein as an unmounted HGA). Advantages of this apparatus and method include, for example, avoiding time and capital costs associated with testing an HGA mounted on an intermediate mounting fixture; and avoiding time and capital costs associated with maintaining the intermediate mounting fixture. The method and apparatus also improve the efficiency, accuracy, precision, and repeatability of aligning an HGA for testing.

In another aspect, the invention is a method and apparatus to provide a more efficient method to de-shunt and headset an unmounted HGA. In yet another aspect, the invention is an automated method and apparatus for straightening an unmounted HGA's flex circuit without causing damage during de-shunting.

Also, the invention is a method and apparatus that provides a computer-controlled, automated method to accurately locate and break the shunt tab on an unmounted HGA.

The advantages of these methods also include: avoiding contact between the disc and HGA clamping mechanism; providing a clamping force on the HGA similar to the force applied after the HGA is installed in a drive; improving the efficiency of accurately aligning the HGA for testing; and minimizing additional positional error or vibration by lowering the mass required to hold the HGA and eliminating extra mechanical interfaces.

In yet another aspect, the invention also includes a computer-controlled automated method and apparatus for correcting the positional errors of the flex circuit on an unmounted HGA prior to interconnect with a pre-amplifier. This method and apparatus overcomes errors caused by the differing heights of the pre-amplifier contacts and the flex circuit layers; and improves the clamping mechanism for pressing a flex circuit against a preamplifier's contacts.

Other aspects include: providing a HGA loader that minimizes head angle to disc during loading; permitting loading of an HGA to a disc at multiple radii; providing lock down of the loading device during test; improving the accuracy and cost efficiency of loading an HGA to a disc; reducing the time required to load an HGA; and providing a device that easily accommodates different HGA geometries.

In another aspect, the invention includes a method and apparatus for improving suppression of disc flutter; providing more efficient loading of media; providing more efficient access to the underside of the disc during testing; and providing more efficient access to the structures surrounding the disc for servicing.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6A is one embodiment of the clamp wing assembly in the state of holding the FOS against the electrical contact.

FIG. 7 is one embodiment of a tail pusher and a tail flattener;

Like reference symbols in the various drawings indicate like elements.

DETAILED DESCRIPTION

Figure 1A:
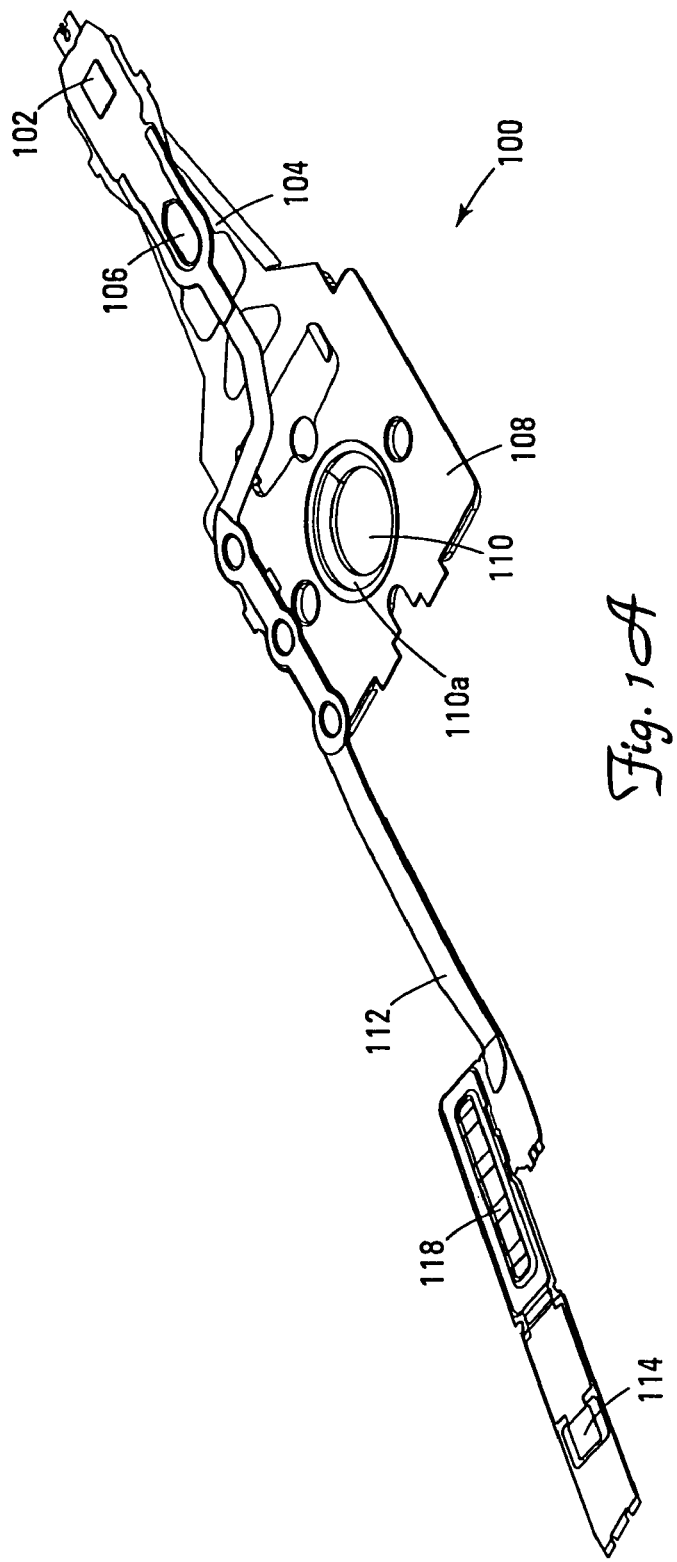
FIG. 1A is a perspective view of an unmounted HGA.
Figure 1B:
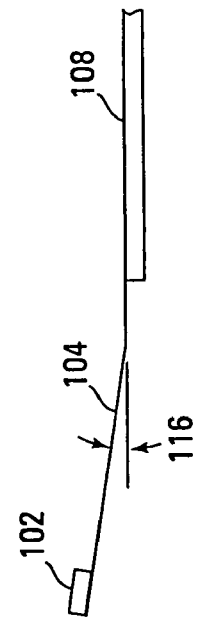
FIG. 1B is a schematic side view of an HGA.

As shown in FIG. 1A, the basic components of an HGA 100 are a head 102, a load beam 104, a tooling hole 106, a base plate 108, a boss hole 110 with an angled surface 110a, and a flex circuit 112 with a flex circuit pads 118 and a shunt tab 114. The head 102 flies above the surface of a disc and contains the read and write transducers. As shown in FIG. 1B, the load beam 104 is a thin, metal structure that has a bend, which provides the spring force to hold the HGA adjacent to the disc during operation. The angle of the bend with respect to the base plate 108 is the free state angle 116.

FIG. 1A shows the base plate 108, which is retained during testing to permit manipulation and alignment of the HGA assembly, and eventually, is mechanically fastened into a disc drive. The boss hole 110 and the tooling hole 106 are used for aligning the HGA. The flex circuit 112 and its components will subsequently be described in more detail.

To eliminate the intermediate mounting fixture from the dynamic electrical testing of HGAs, all of the functions that the intermediate mounting fixture completed now must be completed through some means that does not travel along with the HGA. The absence of an intermediate mounting fixture in a process is referred to herein as an unmounted process. However, even in an unmounted process, the test method and apparatus must still pick, align, headset, de-shunt, load onto a test nest, interconnect with a preamplifier, and load the HGA to the disc. The small size and fragility of the HGA makes it necessary that all of those operations be mechanically controlled.

Figure 2:
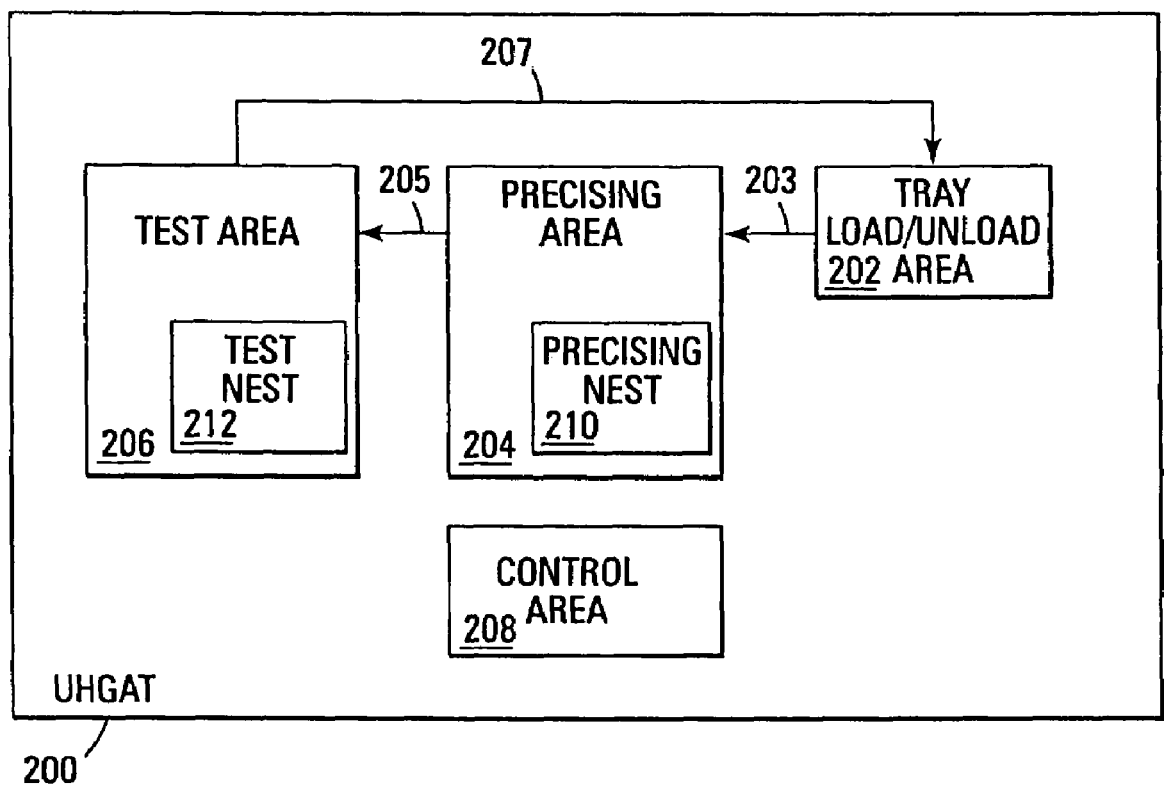
FIG. 2 is a block diagram of an exemplary device that can test unmounted HGAs.

One embodiment of a device that does not use an intermediate mounting fixture is the unmounted HGA tester (UHGAT) 200 shown in the block diagram of FIG. 2. The UHGAT 200 includes, but is not limited to, four main functional areas. Three of the functional areas are process areas: the tray load/unload area 202, the précising area 204 including a précising nest 210, which aligns, de-shunts, and headsets the HGAs, and the test area 206 including a test nest 212, which interconnects the HGA with a preamplifier and loads the HGA to the disc. The fourth functional area, the control area 208, controls the UHGAT automation and eliminates the need for operator intervention during the UHGAT dynamic electrical test.

Figure 2A:
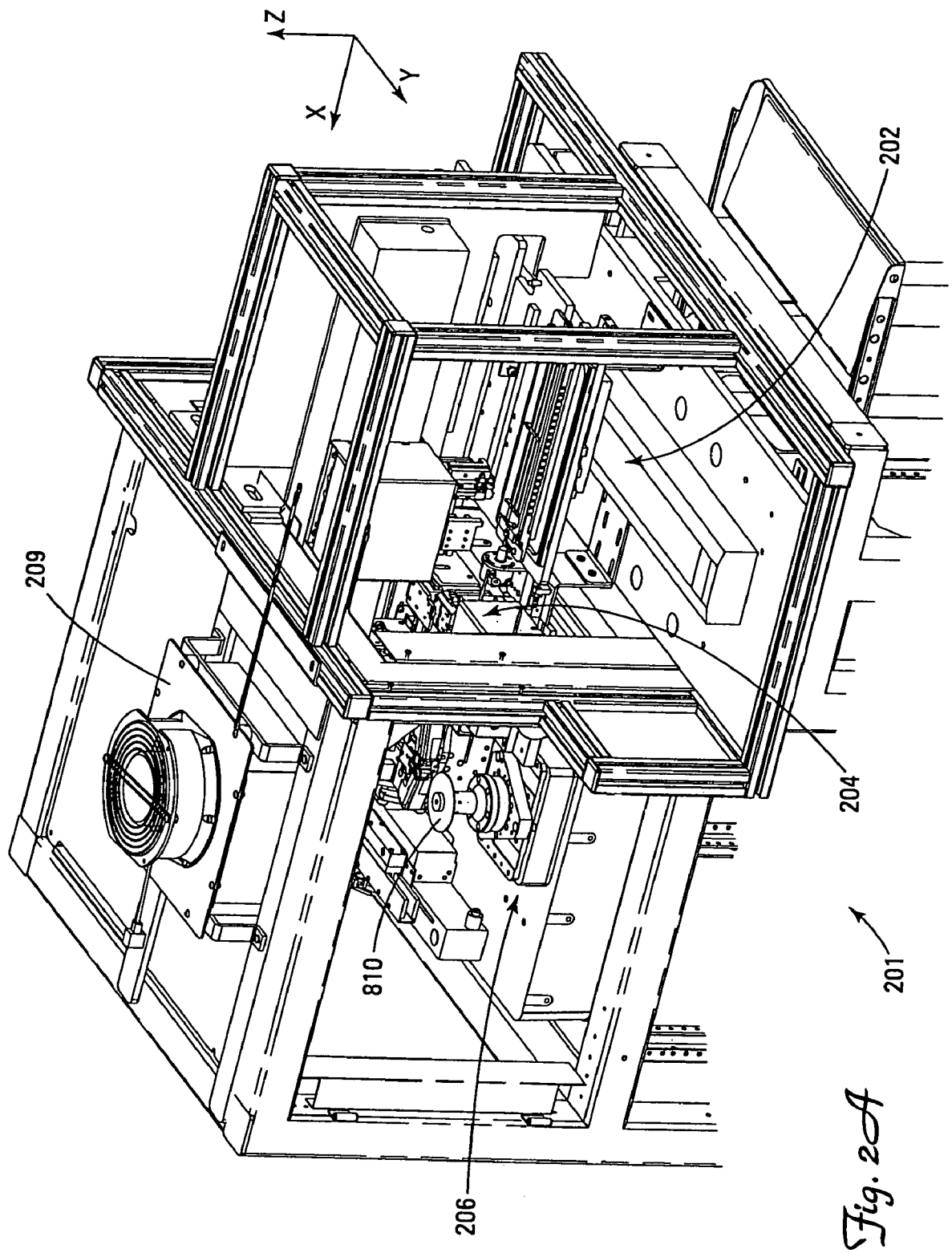
FIG. 2A is one embodiment of a device that can test unmounted HGAs.

FIG. 2A shows a drawing of one embodiment 201 of the UHGAT device 200 with support structures for a fan 209 and actuators described later in greater detail. The UHGAT device 201 shown in the figure includes the tray load/unload area 202, the précising area 204, and the test area 206. The control area 208 is not shown in FIG. 2A. The control area 208 includes a computer, a display with a user interface, an input device, and circuit boards with embedded controllers. An operator may use the user interface to specify settings for the testing process, such as the gauss level during headset at the précising nest 210, and initiates testing with the UHGAT software installed on the computer. Control of the UHGAT machinery is accomplished through the embedded controllers and the UHGAT software. The UHGAT automation ties together the three processing areas by controlling the transfer of HGAs from the tray load/unload area 202 to the précising area 204, and then to the test area 206 before the automation finally brings the HGA back to the tray load/unload area 202 as illustrated in FIG. 2 by the arrows 203, 205, and 207, respectively.

Figure 2B:
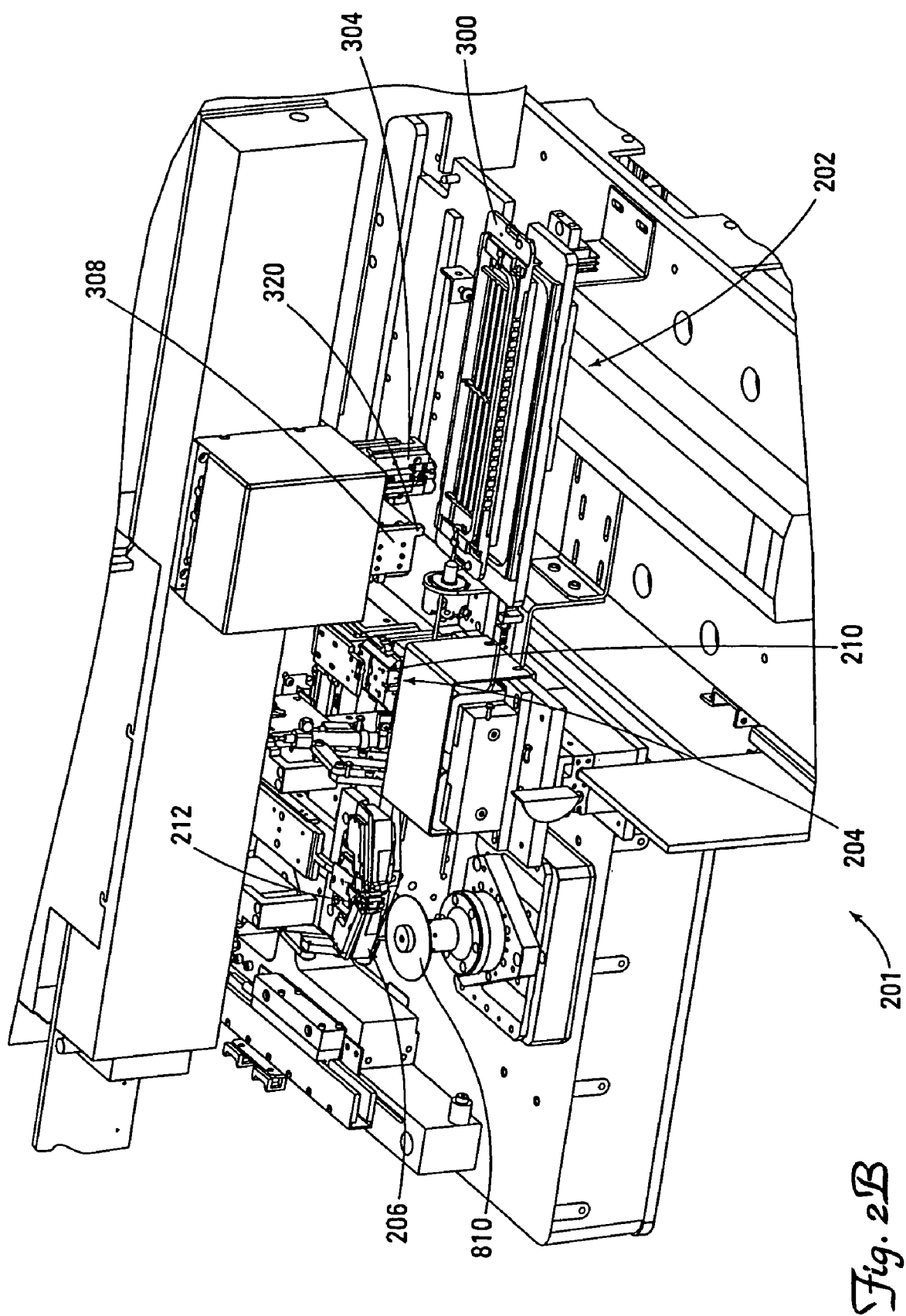
FIG. 2B is an enlarged view of the device in FIG. 2A without a portion of its support structure.

FIG. 2B is an enlarged view of the device 201 in FIG. 2A without a portion of its support structure. With the removal of the support structure, one may more clearly see the three processing areas. In the embodiment shown, there may be a tray 300 in the tray load/unload area 202. The précising nest 210 may be in the précising area 204, and the test nest 212 and a disk 810 may be in the test area 206. Additionally, automation that moves the HGAS to and from each area includes two end effectors, a first end effector 304 and second end effector 308, that use vacuums to hold the HGAs while they are transferred.

Figure 3:
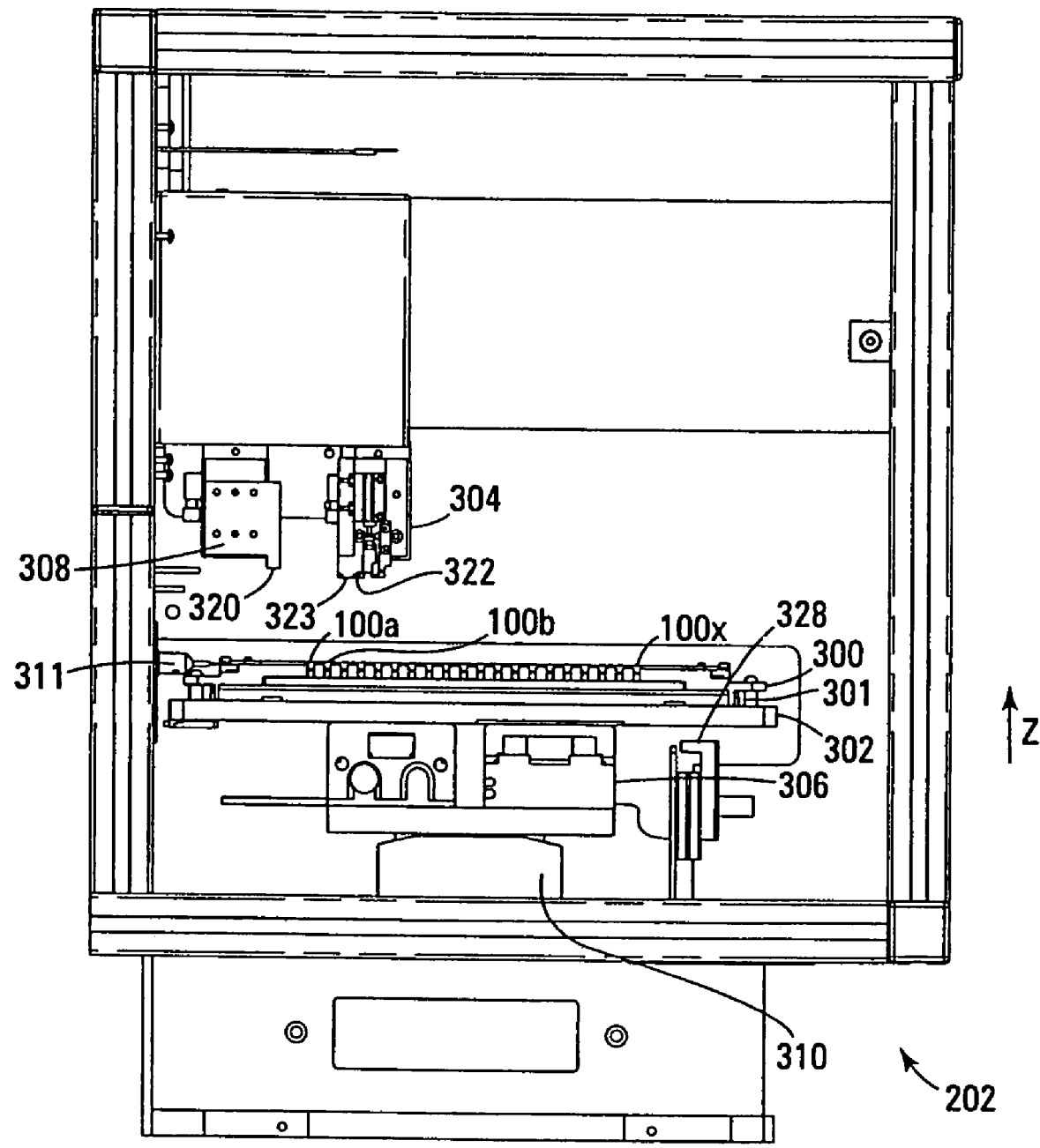
FIG. 3 is one embodiment of a tray load and unload area of the device shown in FIGS. 2A and 2B.

FIG. 3 shows one embodiment of the tray load/unload area 202 of the device 201. The first and second end effectors 304 and 308 are each attached to a first and second pneumatic linear actuator (not shown in FIG. 3), respectively, which are attached to a main pneumatic linear actuator (not shown in FIG. 3). The pneumatic linear actuators move the end effectors in the 'z' direction and are controlled using conventional techniques with solenoid valves, hall sensors and flow controls. The main pneumatic linear actuator is attached to a linear motor positioning stage (not shown) and is also controlled using conventional techniques by a solenoid valve, hall sensors and flow controls. More expensive and complicated servo controlled actuators could replace any of the pneumatic linear actuators if the higher precision and velocity control could justify the increased cost. The linear motor positioning stage moves the first and second end effectors 304, 308 between the tray load/unload area 202, the précising area 204, and the test area 206. The linear motor positioning stage may be a high precision and high-speed servo-controlled actuator. A very accurate high-speed servo controlled actuator is needed to ensure that the HGA is delivered to the correct position very accurately in a minimum amount of time.

As shown in FIG. 3, the first processing area is the tray load/unload area 202 where an operator loads and unloads trays containing HGAs. After the tray load/unload area 202 is loaded with the tray 300, which may be done manually by an operator or using an automated placement process, the UHGAT automatically identifies the HGAs by reading a radio frequency (RF) tag 301 associated with or placed inside the tray. Once the trays have been loaded, the UHGAT picks the HGA from the tray using a vacuum 322 of the first end effector 304.

When an HGA is removed from the tray it is moved to a second processing area, the précising area 204, where it is aligned on the précising nest 210, de-shunted and headset. After these operations are complete, the HGA is moved using the end effector 304 from the précising area 204 to a third processing area, the test area 206. During transfer from the précising area to the test area, the HGA maintains the alignment set on the précising nest 210. After placement on the test nest 212, the flex circuit 112 (See FIG. 1A) is aligned and moved down to make interconnect with a preamplifier. The preamplifier contacts are large flat gold contacts that cover the tolerance range of the flex circuit's 112 position.

Next, the linear motion positioning stage moves both first end effector 304 and second end effector 308 back to the tray load/unload area 202. The next HGA is picked from the tray and brought to the précising area 204. Then the first HGA is loaded to the disc using a four bar loader 800 (See, for example, FIG. 8) and dynamic electrical testing proceeds. After electrical testing is complete, second end effector 308 removes the first HGA from the test nest 212. The next HGA, already on first end effector 304, is loaded onto the test nest 212. The same sequence continues until all of the parts in the trays have been tested.

The following text describes each of the three functional process areas in more detail beginning with the tray load/unload area 202. The steps that may occur include placing a tray in the load/unload area and initiating the automated testing process. The tray's presence is sensed, and the tray's RF tag is read. Based on the read information, untested HGAs are selected for testing and the testing process can be configured based on the type of HGA in the tray. The tray's lid is opened, and an HGA is picked up off the tray. Next, the HGA is moved from the tray load/unload area 202 to the précising area 204.

FIG. 3 shows a tray 300 in tray load/unload area 202. Other trays may be in the tray load/unload area 202. An operator places the tray 300 on a tray holder 302, wherein the holder 302 can accommodate two trays. Moreover, the holder 302 is attached to a tray pneumatic actuator 306, which, in turn, can be attached to a tray load/unload actuator 310. More than one tray pneumatic actuator may be connected to the tray load/unload actuator 310. For example, the actuator 310 may be connected to two tray pneumatic actuators, wherein each of the tray pneumatic actuators is attached to a tray holder. This configuration allows for independent movement of each tray holder using the separate tray pneumatic actuators and for movement of all the tray holders using the tray load/unload actuator 310.

The tray 300 includes a tray lid (not shown in FIG. 3) and an RF tag 301. HGAs 100a-100x are located on the tray. In one embodiment, the tray load/unload area 202 accommodates up to four trays and each tray can hold up to twenty HGAs. The trays used in the UHGAT are the same trays that are used in operations previous and subsequent to the UHGAT. The UHGAT may be designed with two trays per side to enable tray load/unload from one side of the UHGAT while testing parts from the other side of the UHGAT. Simultaneous load/unload and testing enables the UHGAT to maximize units per hour.

FIG. 3 also shows an RF tag reader 328 placed below the tray 300. The RF tag reader 328 is attached to an actuator, which actuates the reader 328 vertically to read the tray's RF tag. The first end effector 304 and second end effector 308 are attached to the automation structure as previously described.

The first and second end effector's vacuums 322 and 320 are located on the bottom surface of the first and second end effectors 304 and 308, respectively. An optical sensor (not shown in FIG. 3) is placed below each tray to determine the tray's presence. In one embodiment, the described structures accomplish the steps occurring in the tray load/unload area 202 in the following manner. An operator places tray 300 in tray load/unload area 202, and the optical sensor detects the tray's 300 presence and notifies the UHGAT that the tester can select HGAs from tray 300. During tray loading, the RF tag reader 328 reads the RF tag, which may contain information such as which HGAs should be tested and whether the flex circuit 112 of the HGA is oriented to the left or the right. The orientation information is used to configure the UHGAT for the appropriate HGA testing processes, including HGA placement on the précising and test nests, selection of the appropriate preamplifier to switch on, and the disc spin direction. Additionally, if an HGA fails the testing process, the RF tag may be marked to indicate the HGA's failing status.

To initiate the automated testing process, an operator uses the user interface on the display attached to the computer in the control area 208. Once the automated testing process begins, it will continue as long as trays are loaded with HGAs to be tested. After initiation, an automated pneumatic screwdriver 311 opens the tray lid. First end effector 304 moves above the HGA 100a to be tested, creates a vacuum with the vacuum 322, and sucks the HGA's base plate 108 against first end effector's bottom surface 323. Next, first end effector 304 transports the HGA 100a to précising area 204.

The steps that occur in the précising area 204 include moving the HGA 100a above and then lowering it onto the précising nest 210. As the HGA 100a is placed on the précising nest 210, pins align the HGA for eventual testing with the disc. Then the HGA 100a is simultaneously de-shunted and headset at the précising nest 210, and it is subsequently moved to test area 206.

Figure 4:
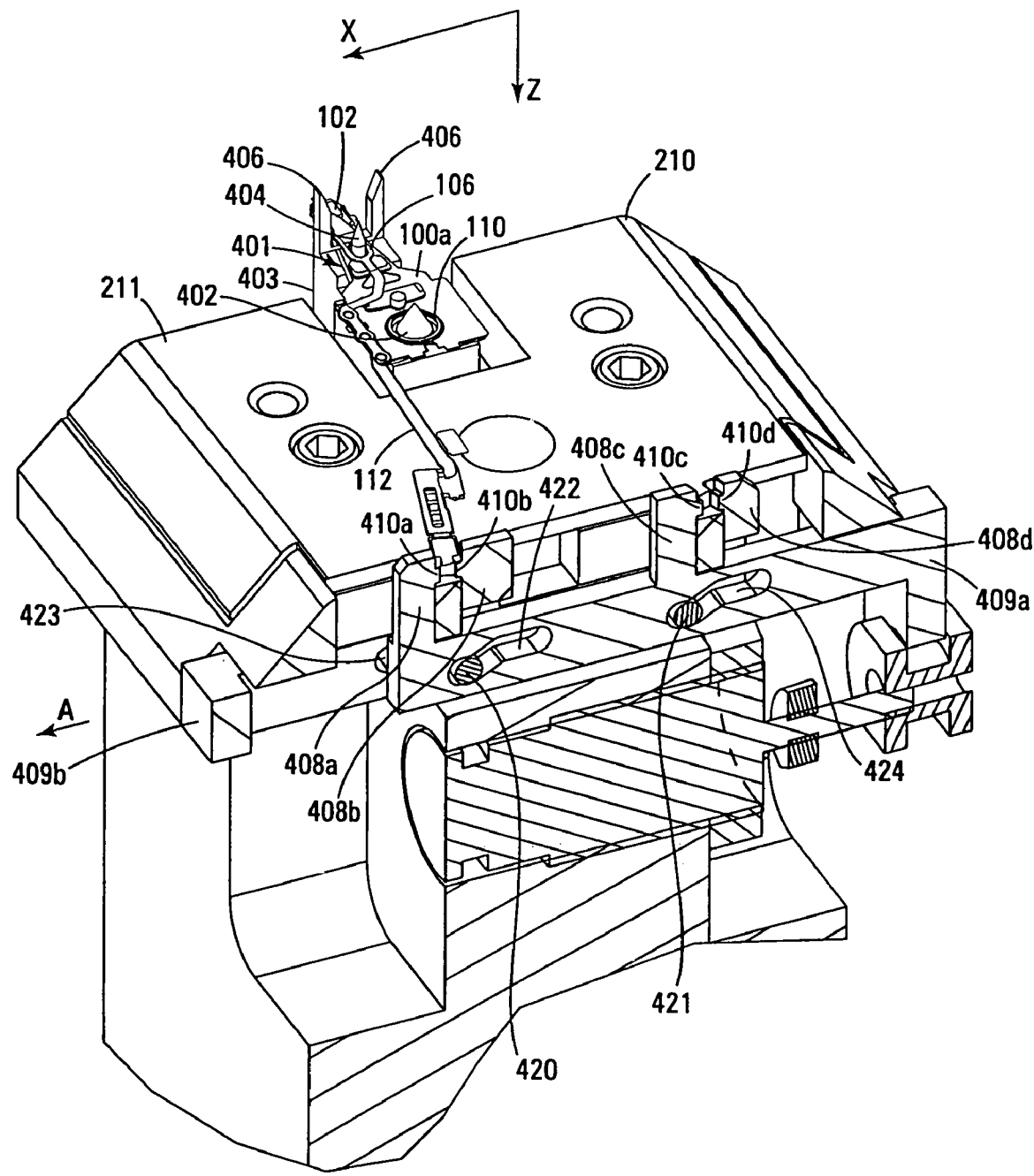
FIG. 4 is one embodiment of a précising nest.

FIG. 4 shows the précising nest 210 in the précising area 204. HGA 100a is positioned on the précising nest 210 so that the boss hole 110 surrounds a boss hole pin 402 and the HGA's tooling hole 106 surrounds a front alignment pin 404. Both the boss hole pin 402 and the front alignment pin 404 are tapered pins located on a top surface 401 of the précising nest 210. FIG. 4 also shows the HGA's head 102 positioned between a pair of tapered pre-alignment guides 406 and extending beyond a lateral surface 403 of the précising nest 210. For future reference, the HGA's flex circuit 112 is viewed as oriented to the right when the flex circuit is angled to the right relative to an observer facing the précising nest's lateral surface 403 from which the HGA's head 102 protrudes.

Referring to FIG. 4, the précising nest 210 further includes two sets of air actuated flex-on-suspension (FOS) aligners 408a, 408b and 408c, 408d. Each set of FOS aligners 408a, 408b and 408c, 408d are sliding mechanisms that, starting from an open position, move towards each other to push the flex circuit 112 to a predetermined de-shunting position, and constrain it from side-to-side motion. Using the nomenclature previously mentioned defining when a flex circuit is right oriented, the right set of FOS aligners 408a, 408b moves flex circuits that are oriented to the right (see arrow A in FIG. 4), and the left set of FOS aligners 408c, 408d moves flex circuits that are oriented to the left. A flex support is located on each set of the FOS aligners and protrudes from the side designed to contact the flex circuit 112. The flex supports 410a, 410b on the FOS aligners 408a, 408b are positioned under the flex circuit 112 after the FOS aligners 408a, 408b move the flex circuit 112 to its de-shunting position. A similar set of flex supports 410c, 410d are present on the FOS aligners 408c, 408db and support the flex circuits that are oriented to the left.

Figure 4A:
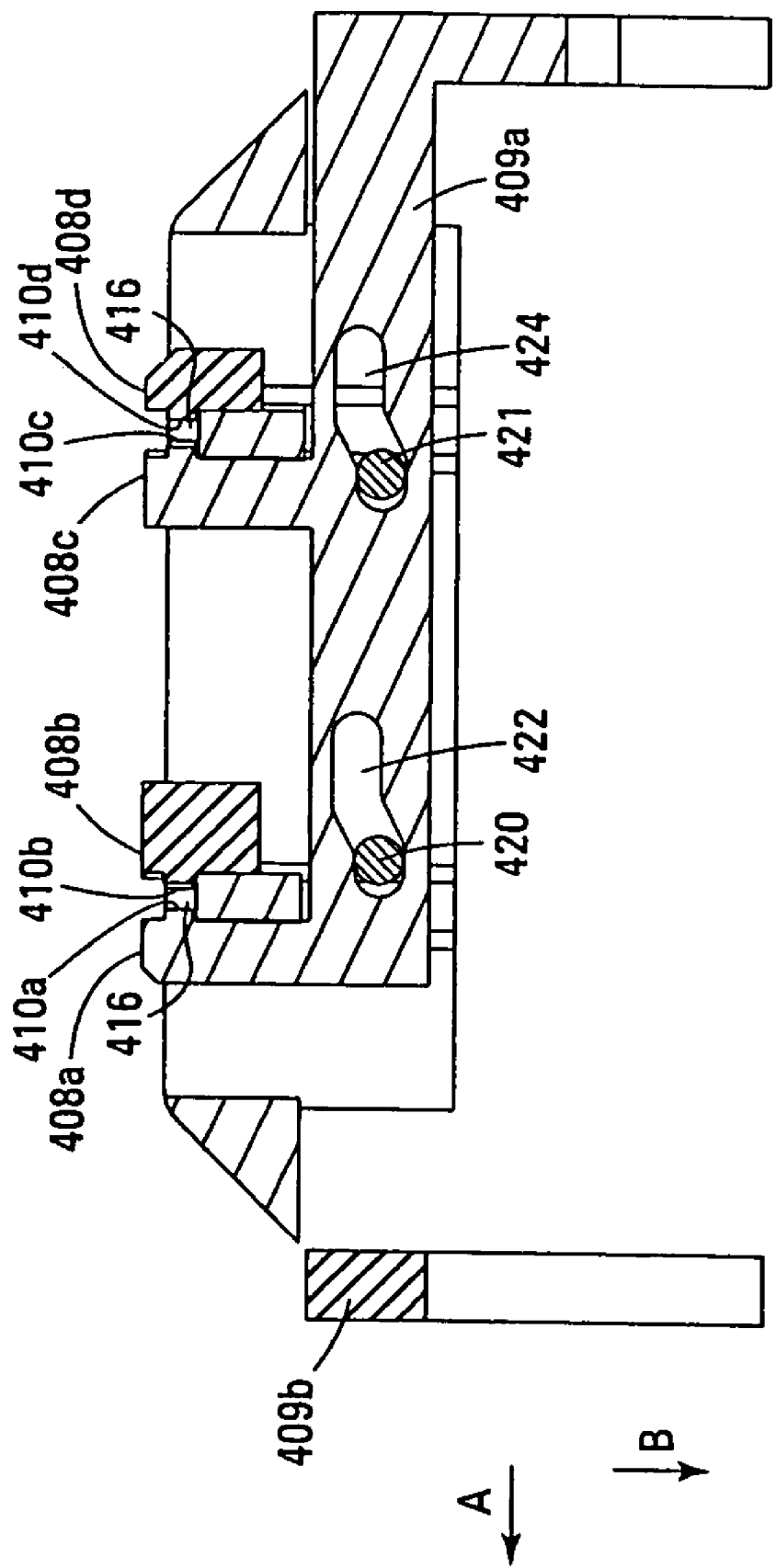
FIG. 4A is a more detailed view of flex-on-suspension (FOS) aligners shown in FIG. 4.

Referring to FIG. 4a, which shows an enlarged view of the FOS aligners 408a, 408b and 408c, 408d in the closed position, the FOS aligners move in concert when actuated. The FOS aligners' basic components include two rectangular bars, a first bar 409a and a second bar 409b. The set of FOS aligners 408a, 408c are part of the first bar 409a, and the FOS aligners 408b, 408d are part of the bar 409b.

When the bar 409a is actuated in the direction of arrow A, the bar 409a moves along a path constrained by alignment pins 420, 421 and respective cooperating angled slots 422, 424. This movement causes the FOS aligners 408a and 408c to move first laterally in the direction of arrow A, and then to move in a direction B generally downward from their original position and normal to the arrow A. Simultaneous to the movement of the bar 409a, the bar 409b moves in a direction opposite the arrow A. The movement of the bar 409b is also constrained by the pins 420, 421 and respective cooperating angled slot 423 and a slot (not shown in FIG. 4). This constraint causes the FOS aligners 408b and 408d to move first laterally in a direction opposite the arrow A, and then to move in the direction B. The lateral and downward movements of the bars 409a and 409b may release the flex circuit 112 from its clamped position between the flex supports 410a, 410b if the circuit 112 is right aligned or the supports 410c, 410d if the circuit is left aligned.

Conversely, when bar 409a moves in a direction opposite the arrow A, the FOS aligners 408a and 408c move first laterally opposite the arrow A and then upward opposite the direction B. Simultaneous to the movement of the bar 409a, the bar 409b moves in the direction of the arrow A, and the FOS aligners 408b and 408d move first laterally in the direction of the arrow A and then upward opposite the direction B. These movements by the bars 409a and 409b may constrain and clamp the flex circuit 112 between the flex supports 410a, 410b if the circuit 112 is right aligned or the supports 410c, 410d if the circuit is left aligned.

The shunt tab 114 resides on the flex circuit 112 (see FIG. 1A) and electrically shorts together an HGA head's readers and writers to protect the HGA from electrostatic discharge damage. The shunt tab 114 must be broken or removed before an HGA can be electrically tested. Breaking the shunt tab 114 must be done without damaging, bending or twisting the flex circuit 112. Before breaking the shunt tab, it is first moved to the de-shunting position, then clamped between the flex supports 410a, 410b or 410c, 410d (See FIGS. 4 and 4A). Referring to FIG. 4A, under the positioned shunt tab is a shunt tab hole 416, which is a hole in the précising nest 210 that provides clearance for the shunt tab when it is folded down.

Figure 4B:
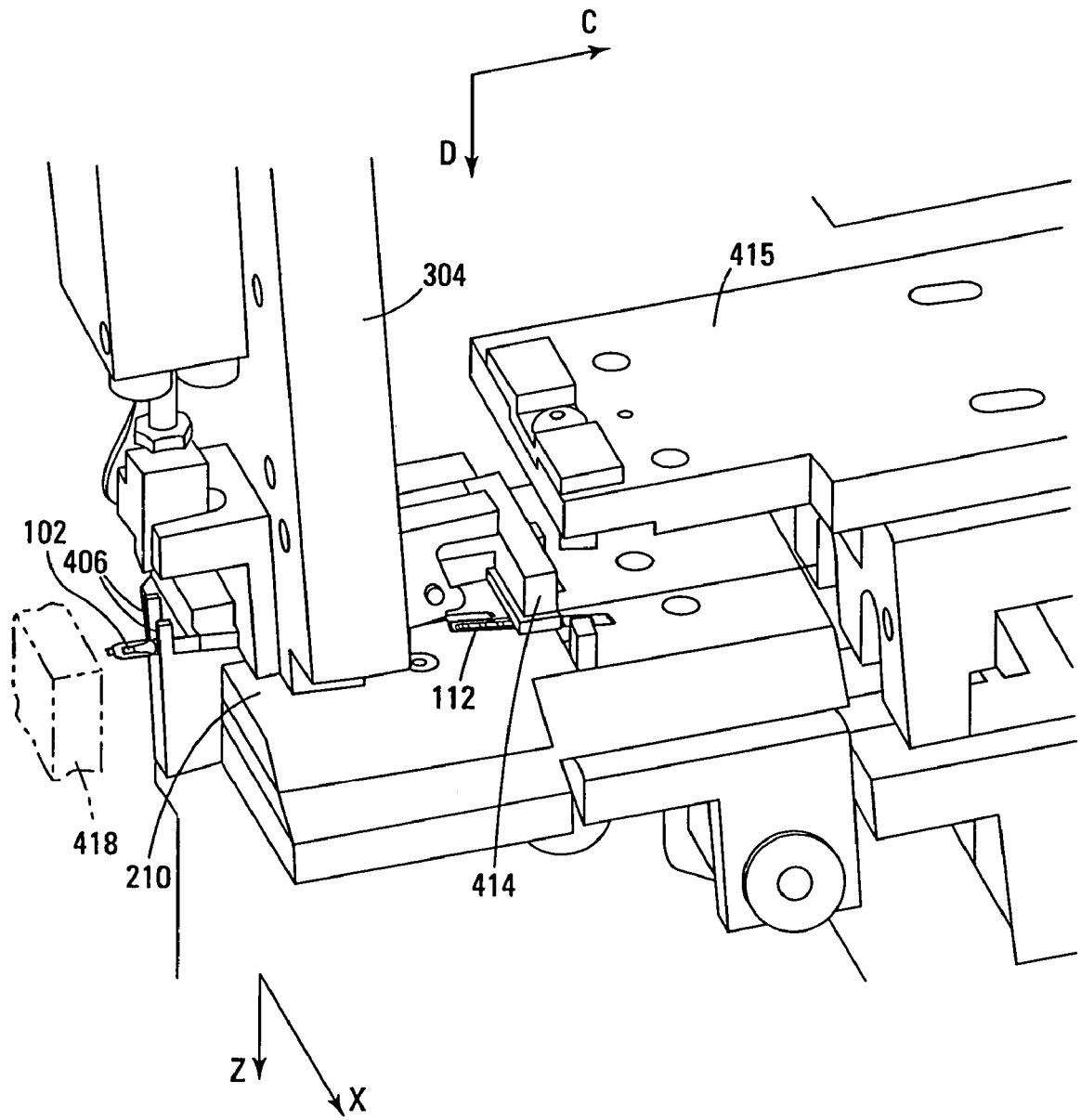
FIG. 4B is one embodiment of a précising area including an electromagnet, the précising nest, and a device for de-shunting the HGA shown in FIGS. 1A and 1B.
Figure 4C:
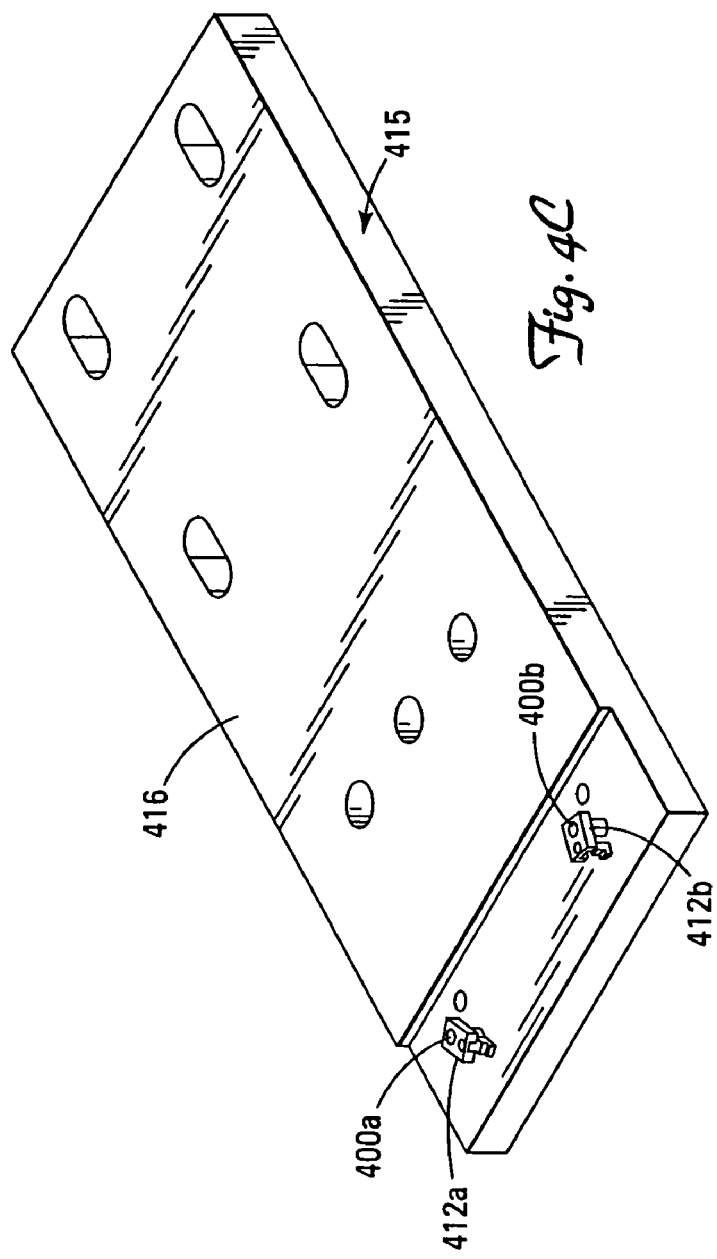
FIG. 4C is a more detailed view of a portion of the de-shunting device shown in FIG. 4B.

Referring to FIG. 4B, a de-shunt top plate 415 may be attached to a pneumatic linear actuator (not shown) that moves the plate horizontally in the direction of arrow C and another pneumatic linear actuator (not shown) that moves the plate vertically downward in the direction of arrow D. After actuation, the de-shunt top plate 415 is positioned partially above the flex circuit 112, and a de-shunt pin 400a (See FIG. 4C) on the underside 416 of the plate 415 is positioned above the shunt tab. Referring to FIG. 4C, a right de-shunt pin 400a is a small pin with a chisel tip and is precisely located on the underside 416 of the de-shunt top plate 415 to punch the shunt tab 114 on the right-oriented flex circuit after the FOS aligners 408a, 408b and flex supports 410a, 410b have constrained the flex circuit 112 and the shunt tab in the de-shunting position. In one embodiment, the pin 400a may be roughly one-third of the length of the shunt tab 114 and approximately the same width. In other embodiments, the pin 400a may be different lengths and widths. Similarly, a left de-shunt pin 400*b* punches the shunt tab on a left-oriented flex circuit retained by FOS aligners 408*c*, 408*d* and flex supports 410*c* and 410*d*. A compression foot 412*a* is attached to the de-shunt top plate 415 and completely surrounds the de-shunt pin 400*a*, while a similar compression foot 412*b* surrounds the de-shunt pin 400*b*.

Figure 4D:
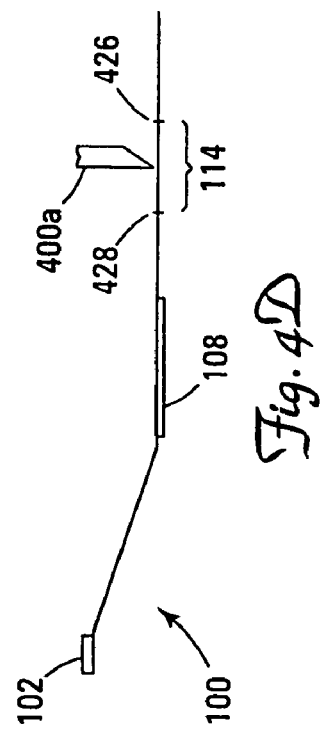
FIG. 4D is a diagram of one embodiment of a de-shunt pin used for de-shunting.

FIG. 4D is a diagram of one embodiment of the de-shunt pin 400*a* used for de-shunting. The figure also shows the shunt tab 114 on the HGA, which may have a perforated side 426 farthest from the base plate 108, and the pin 400*a* may be smaller than the shunt tab. This size difference permits variance in the positioning of the pin over the tab for the de-shunting process. For example, the pin may be positioned so that its outer diameter abuts a side 428 of the shunt tab closest to the base plate or abuts the perforated side 426. When the diameter of the pin abuts the perforated side 426, the tip of the pin does not contact the shunt tab at the perforated side because the tip is chiseled so that it slopes away from the side 426. Instead, the tip contacts the shunt tab at a point that may be more toward the middle of the shunt tab. Using a chiseled tip that contacts the shunt tab at a point away from the perforated side prevents distortion that could occur if a flat pin directly contacted the perforated side 426. Although a flat pin may be used, the shearing force created by the pin on the perforation may deform the HGA.

FIG. 4B also shows a flex circuit tail flattener 414 that is attached to first end effector 304 and is positioned above the flex circuit 112. An electromagnet 418 is attached to an pneumatic linear actuator (not shown) and may be actuated to a position where the electromagnet 418 surrounds the HGA head 102 during the headset operation described below.

Referring again to FIG. 4B, in one embodiment the described structures accomplish the steps occurring in précising area 204 in the following manner. Once the first end effector 304 moves the HGA 100*a* from the tray load/unload area 202 along the X direction to a position above the précising nest 210, it lowers the HGA 100*a* along the Z direction onto a set of alignment pins. As shown in FIG. 4, the alignment pins include the front alignment pin 404, the boss hole pin 402, and the front pre-alignment guides 406 that set the skew, x, and y positions of the HGA 100*a*.

As the HGA 100*a* is lowered along the Z direction by the first end effector 304, the HGA's boss hole 110 slips over the boss hole pin 402 and the tooling hole 106 slips over the front alignment pin 404. As the HGA 100*a* travels downward along the Z direction, the taper on the alignment pins 402, 404 pulls the boss hole 110 and the tooling hole 106 into their proper locations. The tapered pins allow for some misalignment of the HGA 100*a* to the précising nest 210. The HGA alignment is completed while the HGA 100*a* is lowered onto the pins causing a relative motion between the HGA's base plate 108 and the first end effector 304. This relative motion does not harm the HGA 100*a* or the first end effector 304 because the only force on the HGA 100*a* while being lowered onto the pins is due to the vacuum created by the first end effector 304. The vacuum force is sufficient to hold the HGA 100*a* securely in the Z direction while still allowing horizontal translation along the X direction as the HGA 100*a* is pushed into position by the tapered pins. The précising nest's use of the boss hole 110 and tooling hole 106 for alignment makes the HGA testing process more accurate because these features also are used as an alignment datum when the head 102 is attached to the HGA in production. Once the alignment is complete, the HGA 100*a* is held firmly against the précising nest 210 by the first end effector 304 to prevent any movement during the subsequent de-shunt and headset operations.

The précising nest's 210 two pre-alignment guides 406 are also tapered and provide a rough alignment of the HGA 100*a* prior to it reaching the front alignment pin during the downward movement along the Z direction of first end effector 304. The guides are used in the event that the initial position of the HGA 100*a* is far enough out of alignment that the tooling hole 106 would not slip over the taper of the front alignment pin 404.

The alignment of the HGA is critical for the dynamic electrical test because the position of the HGA on the test nest 212 will affect the test results. Aligning each HGA at the précising nest 210 eliminates misalignment caused by variation in HGA position in the tray and tray-to-tray differences. The précising nest ensures that every HGA is aligned relative to the travel axis of the coarse positioning system in exactly the same way, regardless of the HGA's alignment coming out of the tray.

After the HGA 100*a* is aligned in the précising nest 210, the de-shunting process begins. Referring to FIG. 4B, the tail flattener 414 is lowered down over the flex circuit 112 by first end effector 304 just in front of the shunt tab 114. Because the tail flattener 414 is spring loaded, it remains down during first end effector's 304 movement and is in a downward position when placed over the flex circuit 112. When the tail flattener 414 is in place there is an approximate 0.005 inch gap between it and the précising nest 210. The tail flattener 414 gently constrains the flex circuit 112 in the vertical direction but the gap allows the flex circuit 112 to float side-to-side without twisting. Without the tail flattener the de-shunt operation could cause significant yield loss because the flex circuit tends to twist and become positioned incorrectly.

Because the flex circuit 112 can have an inherent twist to it and because the flex circuit 112 is allowed to move freely, the shunt tab 114 is not always in an accurate, predetermined position on the précising nest 210 for the de-shunting operation. To mitigate this problem, once the tail flattener 414 is in place, the FOS aligners 408*a*, 408*b* move the flex circuit 112 into position to ensure that the shunt tab 114 is in the correct location for the de-shunting operation.

In this example, a right-oriented flex circuit is shown in FIG. 4. After moving the flex circuit 112, the FOS aligners 408*a*, 408*b* constrain it from further side-to-side motion. Before the FOS aligners 408*a*, 408*b* begin their movement, they are initially below a top surface 211 of the précising nest 210 where the flex circuit 112 rests. This allows the flex circuit to land or slide freely during alignment without any obstruction on top of the précising nest 210. As the FOS aligners 408*a*, 408*b* move toward the flex circuit 112, the alignment pins 420, 421 and cooperating angled slots 422, 424 cause the aligners 408*a*, 408*b* to rise vertically above the top surface 211 of the précising nest 210 so they can push the flex circuit 112 to its final de-shunting position.

Referring to FIG. 4B, the de-shunt top plate 415 is then actuated horizontally above shunt tab 114 by a pneumatic linear actuator. Next, the de-shunt top plate 415 is rapidly lowered down by another pneumatic linear actuator causing the de-shunt pin 400*a* on the de-shunt top plate 415 to contact the shunt tab 114. As the de-shunt top plate 415 continues to travel downward, the pressure the de-shunt pin 400*a* exerts on the shunt tab 114 causes the shunt tab 114 to break along the perforated side 426 and fold down away from the flex circuit 112. The shunt tab hole 416 shown in FIG. 4A provides clearance for the shunt tab 114 when it is folded down.

To ensure that the flex circuit 112 does not bend or get pulled down into the shunt tab hole 416 as the shunt tab 112 is punched, the flex supports 410*a*, 410*b* are located on the FOS aligners 408*a*, 408*b* as shown in FIG. 4A. As the FOS aligners 408a, 408b slide towards the flex circuit 112, the flex supports 410a, 410b are positioned directly under the sides of the flex circuit 112 around the shunt tab 114. The flex circuit 112 is also supported in front and back of the shunt tab 114 by the précising nest 210.

To prevent buckling of the thin walls of the flex circuit 112 around the shunt tab 114 during the de-shunt operation, the compression foot 412a is attached to the de-shunt top plate 415 as shown in FIG. 4C. The compression foot 412a is spring-loaded and can travel in the vertical direction. As the de-shunt top plate 415 travels downward towards the shunt tab 114, the compression foot 412a compresses and holds the flex circuit 112 before the de-shunt pin 400a comes in contact with the shunt tab 114.

After de-shunting, the de-shunt top plate 415 and the FOS aligners 408a, 408b move back to their unactuated positions. When the FOS aligners 408a return to their non-actuated position the tail flattener 414 remains in its location but does not hold or impede the flex circuit 112 from moving horizontally to its natural position. If the tail flattener were to keep the flex circuit from moving to its natural position, the précising operation would likely fail due to the force that the constrained flex circuit would apply on the HGA 100a when the HGA was removed from the alignment pins.

At the same time the de-shunt operation occurs, the headset operation occurs. Referring to FIG. 4B, a powerful electromagnet 418 attached to a pneumatic linear actuator is actuated to a position where it surrounds a portion of the HGA 100a that extends from the précising nest 210 and creates a magnetic field around the HGA head 102. An operator can control aspects of the headset operation through the UHGAT software such as gauss level, duration, and pre/post-field collapse delays. After the headset is complete, the electromagnet 418 is turned off and moved back to its un-actuated position. The materials of the précising nest 210, the first end effector 304, and the second end effector 308 can be selected to ensure that the electromagnet 418 does not leave a residual magnetic field on the internal components of the UHGAT.

Although the de-shunt and headset operations occur in parallel, de-shunting may take less time than the headset, which allows the de-shunt operation to add zero additional test time. Performing the operations in this manner can be a benefit compared to manual testing using the intermediate mounting fixture because the latter method typically requires a separate process step for de-shunting. Also, using this method may ensure each HGA achieves a uniform gauss level and exposure time because the headset operation is entirely automated and completed inside the UHGAT.

Referring again to FIGS. 2-3, after completion of the alignment, de-shunt, and headset operations, the first end effector 304 is raised to move the aligned HGA 100a to the test area 206. As the HGA 100a is moved, the vacuum force created by the vacuum 322 of the first end effector 304 maintains the HGA's alignment that was set on the précising nest 210. In other embodiments, a mechanical device may be substituted for the vacuum 322 used to maintain alignment of the HGA during placement and removal from the précising nest 210. The device may hold the HGA 100a above the précising nest 210 and release it on the alignment pins located on the nest 210. The device may use a variety of methods to mechanically hold the HGA including clamping, hooking, and carrying. After alignment on the nest 210, the device may recapture the aligned HGA. The device may then transport the HGA to the test nest 212 while maintaining the HGA's alignment.

When the précising nest 210 is first attached to the UHGAT, it is accurately aligned with the test nest 212 using gauges to ensure both nests are in known locations so that the alignment performed at the précising nest 210 will be accurate when the HGA 100a is moved to the test nest 212.

The steps that may occur in the test area 206 include placing the HGA 100a on the test nest 212 while maintaining the alignment set at the précising nest 210 and preparing the HGA 100a for testing with a disc 810. The HGA's flex circuit 112 is flattened and a connection is made with a preamplifier, and a second HGA 100b is picked up from the tray 300 and moved to the précising area 210. In parallel with the movement of the second HGA 100b, the first HGA's head 102 is loaded to the disc 810. A dynamic electrical test is performed. The second HGA 100b is moved from the précising area 210 to the test area 212, and the first HGA 100a is removed from the test nest 212. Next, the second HGA 100b is placed on the test nest 212, and the first HGA 100a is returned to the tray 300 in the tray load/unload area 202. This process continues until all the untested HGAs are tested.

Figure 5:
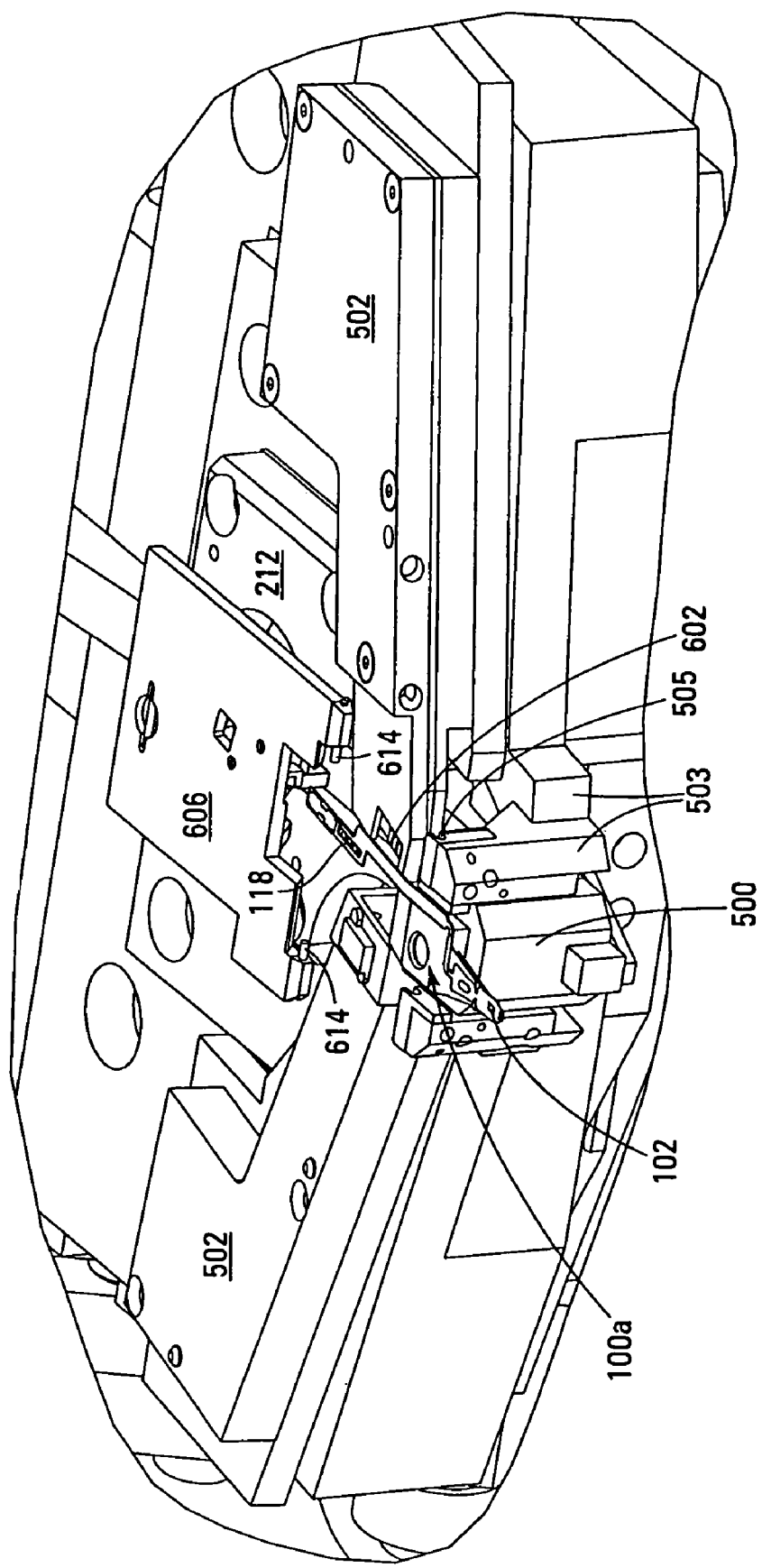
FIG. 5 is one embodiment of a portion of a test area.

FIG. 5 is one embodiment of a portion of the test area 206. The portion includes the test nest 212, the collet assembly 500, a preamplifier assembly 502, a pivot bracket 503, and a clamp wing 606. The collet assembly 500 and the preamplifier assembly 502 may be attached to the pivot bracket 503. In one embodiment, the preamplifier assembly 502 may have gold contacts 602 that enable interconnection between the preamplifier and the HGA's flex circuit pads 118. In another embodiment, a solderless connector may permit the interconnection. The clamp wing 606 has clamp wing pins 614 that can engage slots 505 in the pivot bracket 503. The clamp wing 606 is part of a clamp wing assembly 600 that is discussed later in greater detail.

Figure 5A:
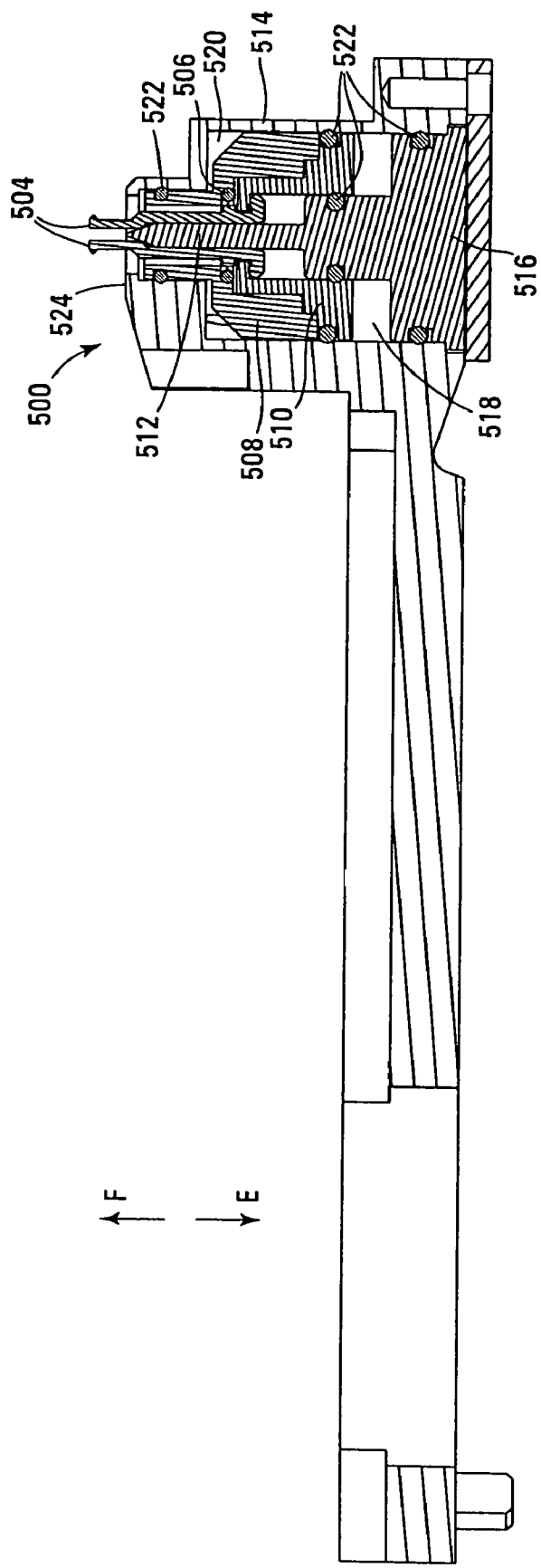
FIG. 5A is a sectional view of an embodiment of a nest with a collet assembly.

FIG. 5A shows a cross-section of the test nest 212, which includes the collet assembly 500 used to secure the HGA 100a for dynamic electrical testing with the disc 810. It is a small, air driven assembly that applies a downward force in the direction of arrow E on the HGA base plate 108. The test nest 212 is very stiff with a low mass and is attached directly to a micro-actuator (not shown), which maintains alignment of the HGA during clamping and needs no external tooling. The collet assembly 500 contains an integrated air piston 507 (See FIG. 5B), which includes an o-ring 506, a piston top 508 and a retainer 510 that move during actuation (See FIG. 5A). Surrounding the collet assembly 500 is the collet housing 514, and on the top surface of the housing 514 is the mounting area 524, where the HGA 100a is placed. FIG. 5A also shows seals 522 located within the collet assembly 500.

Figure 5B:
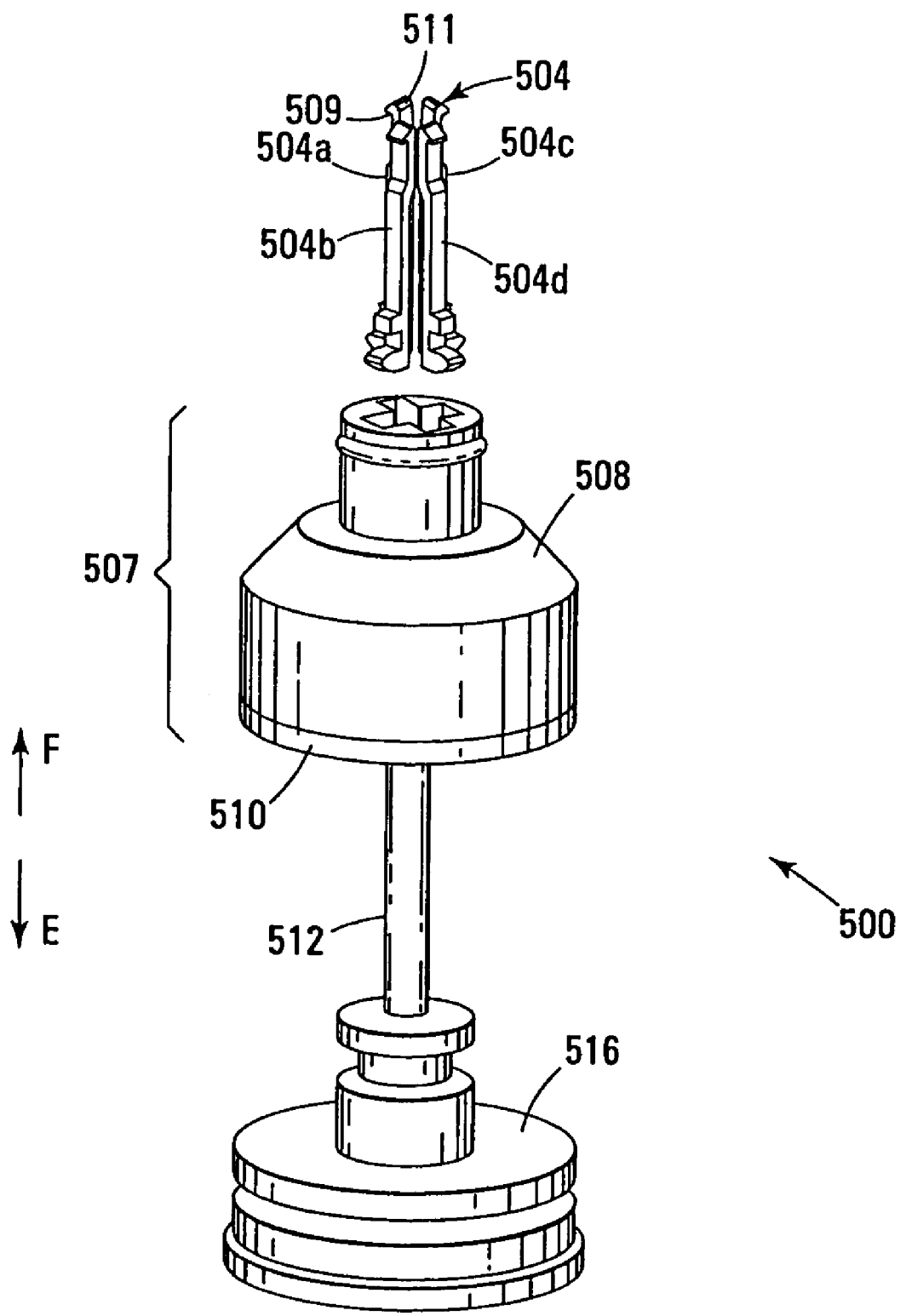
FIG. 5B is an exploded view of the collet assembly shown in FIG. 5A.

FIG. 5B shows one embodiment of an exploded view of the collet assembly 500. The assembly may be divided into three functional parts: collet fingers 504, the air piston 507, and a spreader pin 512 on the spreader pin base 516. The collet fingers 504 may extend through the piston top 508 of the air piston 507. In the embodiment shown, the assembly 500 is made up of four individual fingers 504a, b, c, d, however, it could be made with three fingers, or as an integrated single flexure finger assembly, depending on the size and shape of the article to be clamped into position. In this embodiment, an o-ring 506 (shown in FIG. 5A) fits around the base of the fingers and provides the retracting force to keep the fingers 504 from spreading when the air piston 507 is pushed upwards in the direction of arrow F. The retainer 510 holds the fingers 504 in place relative to the piston top 508 and enables their free vertical movement on a spreader pin 512. The spreader pin 512 is stationary and is attached to a hollow spreader pin base 516.

Figure 6:
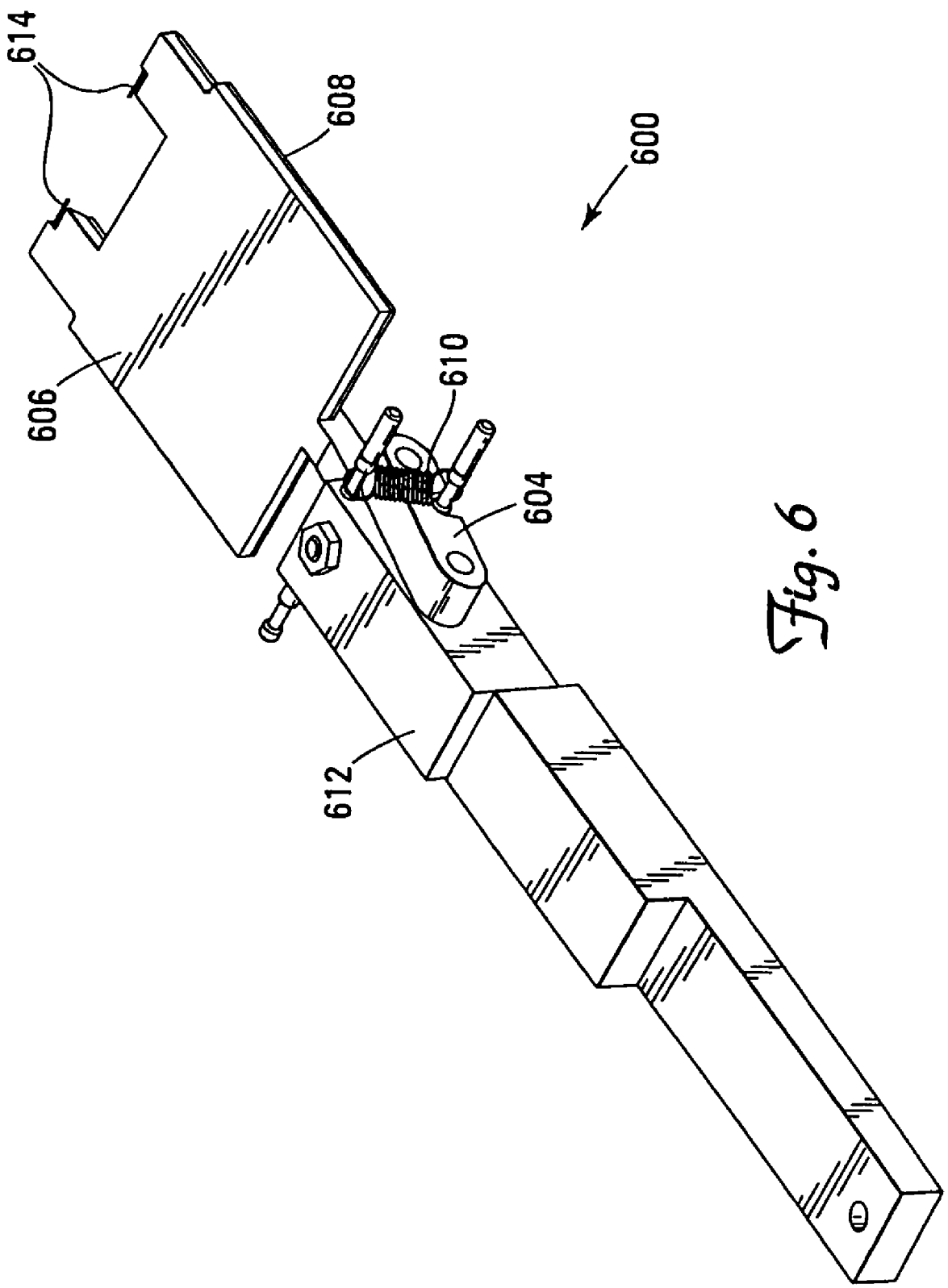
FIG. 6 is one embodiment of a clamp wing assembly that may be used to hold the FOS against an electrical contact.

FIG. 6 shows a clamp wing assembly 600 for making interconnect between the HGA flex circuit 112 and a preamplifier in the test nest 212. The clamp wing assembly 600 is made up of a linkage 604, an arrangement of springs 610, a linkage base 612, a clamp wing 606, and a clamp wing pad 608 on an underside of the clamp wing 606. The linkage 604 has springs 610 on each side of the linkage base 612 that spring load the linkage 604 and hold the clamp wing 606 flat as it is moved over the flex circuit 112. Referring to FIG. 6A, clamp wing pins 614 are located on the front of the clamp wing 606 and engage slots 505 on a pivot bracket 503 (not shown) located near the back edge of the HGA base plate 108. The pivot bracket 503 may not be attached to the test nest 212, which permits free movement of the nest 212 for micro-positioning during the testing of the HGA. Instead, the pivot bracket 503 may be attached to a pivot plate, which is discussed later in greater detail. In one embodiment, the clamp wing pad 608 is located under the clamp wing 606 and in line with an electrical contact, which may be an arrangement of gold contacts 602 on a preamplifier assembly 502.

Figure 6B:
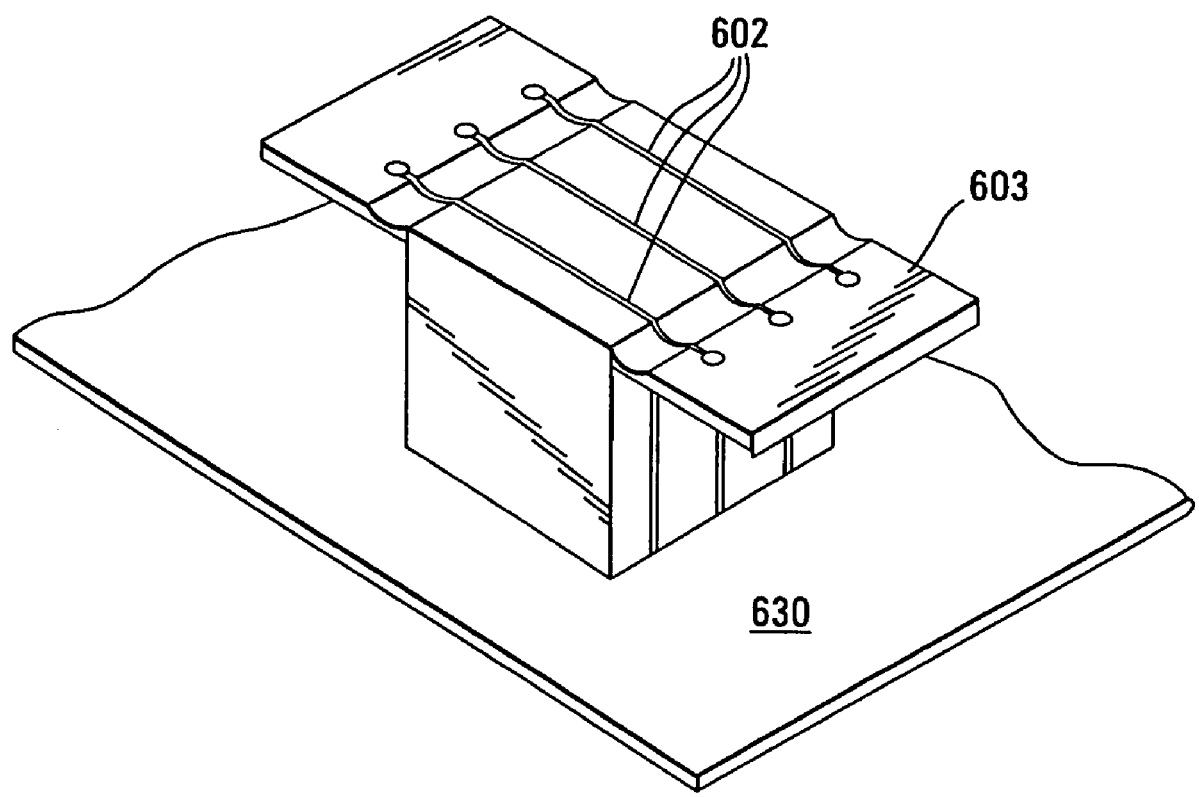
FIG. 6B is one embodiment of the electrical contact using gold blocks.

The gold contacts 602 may be cut from a single piece of conductive material, as shown in FIG. 6B. The conductive material may optionally be brass, plated with nickel, and overlaid with gold. To fabricate the contacts shown in FIG. 6B, the piece of conductive materials is cut or molded to form separations between each contact 602. The contacts 602 are maintained in spaced apart relation by thin break-away tabs 603. After the contacts 602 have been soldered to the printed circuit board (PCB) 630, the tabs are broken or cut off, leaving the individual contacts 602 aligned with each other and the PCB 630.

Figure 6C:
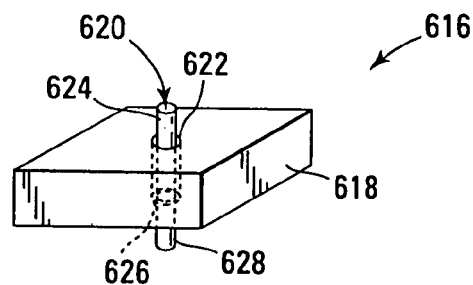
FIG. 6C is another embodiment of the electrical contact using a solderless connector.

In another embodiment, the electrical contact comprises a solderless connector that does not need to be soldered to the PCB 630. As shown in FIG. 6C, the connector 616 includes a housing 618 with at least two apertures. A conductor 620, which includes a first end 624 and a second end 628, may be partially contained within the housing 618. The first end 624 may protrude from a first aperture 622 in the housing 618, and the second end 628 may protrude from a second aperture 626. The conductor 620 may be made from an elastic conductive material, such as full-hard beryllium copper. The conductor 620 may be separated from the connector housing 618 by an electrically insulative material. The material selected for the conductor may be an elastic material that does not permanently deform when deflected, but substantially returns to its original form. The conductor 620 may also be gold plated to lower the resistance at the points where the conductor contacts the HGA and the preamplifier assembly's PCB.

Figure 6D:
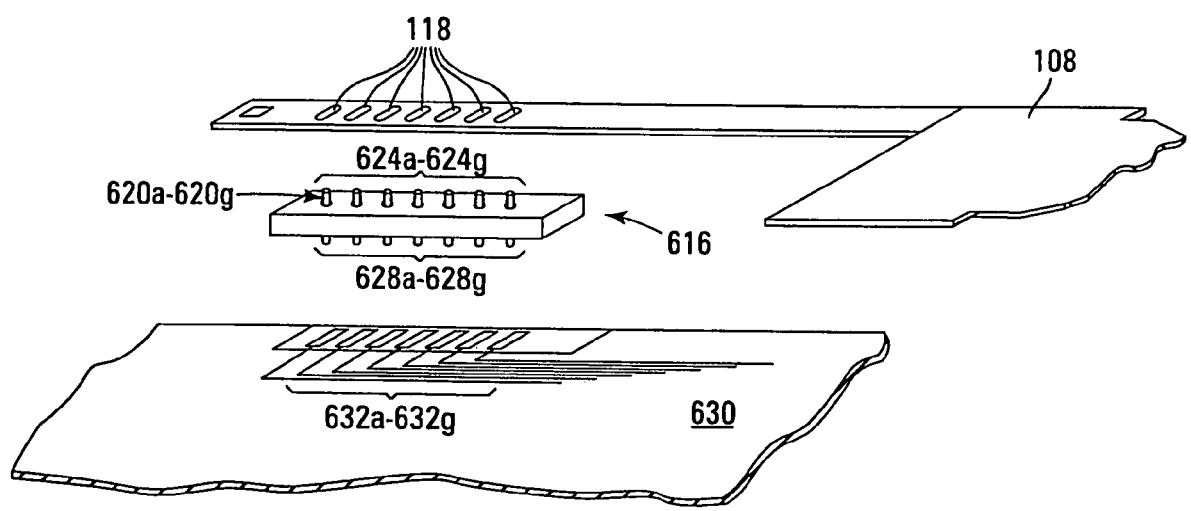
FIG. 6D is a more detailed view of the electrical connector shown in FIG. 6C with optional features.

FIG. 6D is a more detailed view of the solderless connector 616 shown in FIG. 6C with optional features. The connector 616 has several conductors 620a-620g with first ends 624a-624g and second ends 628a-628g that may protrude from apertures 622a-622g and 626a-626g, respectively. The flex circuit pads 118 are aligned with the first ends so that each conductor may make contact with an individual pad when the HGA is positioned for interconnection. The second ends are aligned with trace contacts 632a-632g that are on the preamplifier's PCB 630. When the connector is placed on the PCB 630, each second end may contact an individual trace contact. In one embodiment, the first and second ends protrude from apertures to contact the flex circuit pads 118 and the trace contacts, respectively.

Figure 6E:
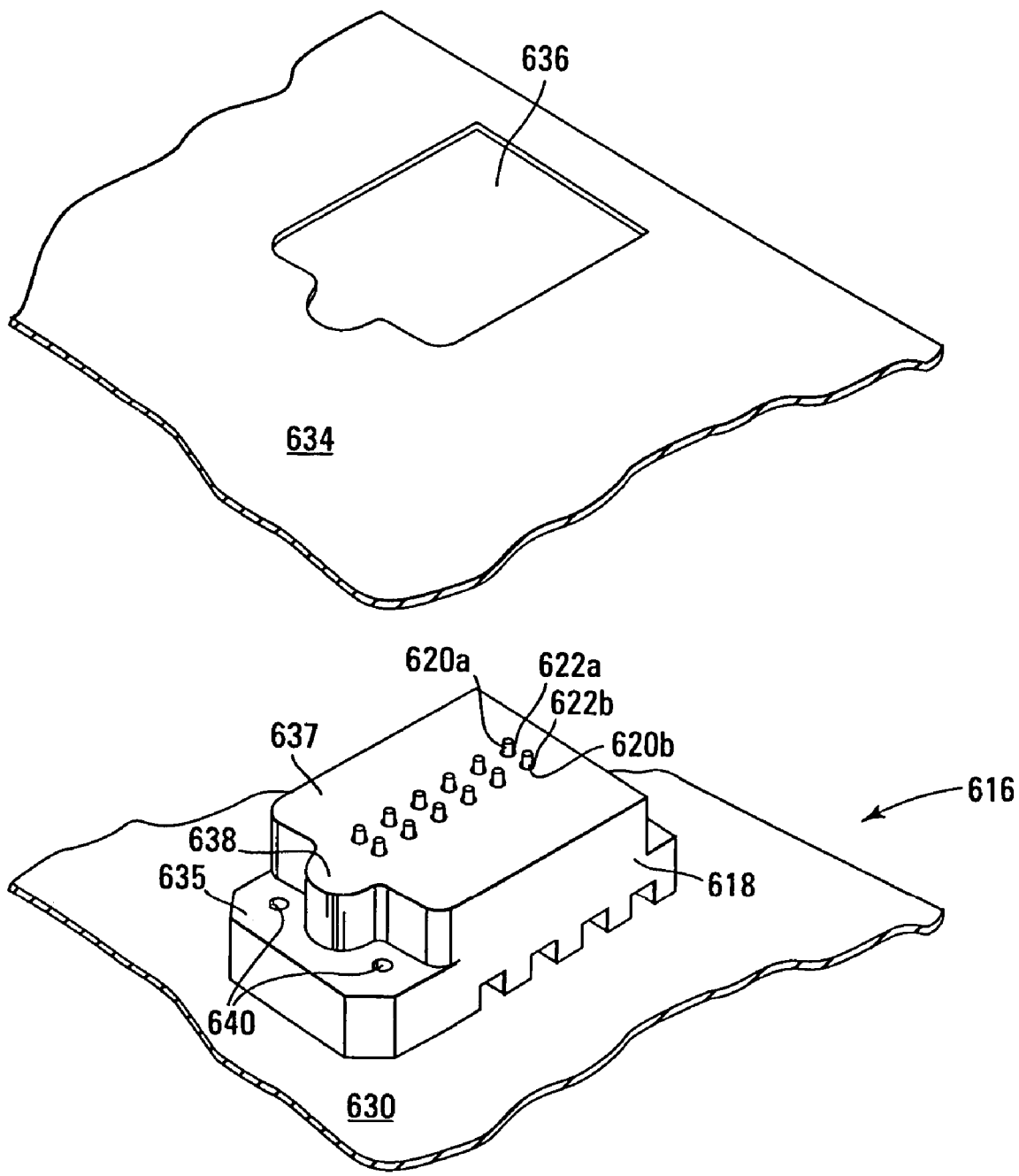
FIG. 6E is an alternative embodiment of the electrical connector with pairs of conductors.

In an alternative embodiment shown in FIG. 6E, more than one conductor may contact the same flex circuit pad and corresponding trace contact. The housing may contain a pair of conductors 620a,b mirrored about a centerline that is aligned with an individual flex circuit pad. The first ends 624a,b of the pair of conductors may protrude from a pair of first apertures 622a,b. The outer circumference of the apertures may be separated by the width of the flex circuit pad less the diameter of each aperture. The spacing permits both conductors to contact the flex circuit pad at the same time when the pad is optimally aligned.

Use of the two conductors permits the flex circuit pad to contact the first end of a conductor even if the pad is not optimally aligned. This increases the variance permitted in the positioning of the flex circuit pads on the connector. For example, if the flex circuit pad was misaligned in a direction to the upper left of FIG. 6B, the left conductor 620a of the conductor pair 620a,b may make contact with the pad even if the misalignment prevents the right conductor 620b from so doing. A surface of the flex tail 112 that faces the connector 616 and surrounds the flex circuit pads 118 may not be conductive because misalignment of the pads may cause one conductor of the pair to contact the surface. If the surface was conductive, interconnection between the preamplifier assembly and the conductive surface may cause a short to occur.

The solderless connector 616 does not have to be soldered to the PCB 630 to establish an interconnection between the HGA and the preamplifier assembly 502. Instead, the connector may be placed on the PCB 630 without the use of solder. This makes removal of the connector 616 much simpler if it needs to be replaced. In some embodiments, the connector 616 may be constrained by a device that holds it against the PCB 630. For example, as shown in FIG. 6E, a PCB cover plate 634 may be placed over the solderless connector 616. The cover plate 634 may have a corresponding aperture 636 that permits a portion 637 of the housing 618 to pass through, while preventing another portion 635 from passing.

The cover plate 634 may be coupled to a structure that supports, surrounds, or is adjacent to the PCB 630 and may constrain or press the other portion 635 of the housing 618 against the PCB 630. In one embodiment, the PCB cover plate 634 may be positioned over the PCB 630 using alignment pins or dowels and corresponding apertures. The pins or dowels may protrude from a surface of the test nest 212, and the cover plate 634 may have apertures that are slipped over the pins or dowels. The cover plate 634 may also be clamped against the PCB 630 and screwed to the surface of the test nest 212 or to a PCB bottom cover plate that is located between the PCB 630 and the test nest 212.

Referring to FIG. 6E, the housing 618 may have one or more alignment features, such as housing alignment element 638, that enables a small connection form factor and ready replacement. This irregularly shaped element 638 permits precise alignment when the PCB cover plate 634 is used to secure the connector 616 to the PCB 630 and prevents incorrect installation of the connector 616. Correctly aligning the connector 616 on the PCB also permits the connector 616 to be presented in a correct orientation to the flex circuit pads 118 because the pads may be positioned to mate with the connector at a predetermined location. In other embodiments, the housing may include housing alignment apertures 640 that are used to align the connector 616. Alignment pins or dowels may protrude from the PCB 630, the test nest 212, and the PCB cover plate 634, or any combination of these, and the apertures 640 may slip over the pins to correctly locate the housing 618.

The housing 618 may be different shapes to accommodate different HGA geometries. The housing size may depend on the length of the flex circuit 112 and the number of flex circuit pads 118 on the circuit 112. For instance, if the flex circuit is short, the housing size may be decreased to permit correct contact. If the flex circuit 112 has many pads 118, then the housing will have to accommodate the required number of apertures and conductors needed to make contact with each of the pads 118. The housing may advantageously be configured to accommodate and enclose the internal structure used to support, retain, and guide the conductors within the housing 618.

In another embodiment, pogo pins embedded in a cover, such as the PCB cover plate 634, may be used instead of the solderless connector 616. The cover plate 634 may be made of a malleable material, such as plastic, to permit embedding the pins. The pins are small metal tubes with a spring inside. On one side of the spring and partially protruding from the tube is a pointed metal tip that digs into the PCB, and on the other side of the spring and partially protruding is a metal portion with prongs that may contact the HGA flex circuit pads. When the cover plate 634 is aligned and placed over the PCB 630, the metal tip of the pins may contact the PCB trace contacts 632. The clamp wing 606 may then press the flex circuit pads 118 against the pronged portion of the pins to establish electrical contact.

FIG. 7 shows the tail pusher 700 and tail flattener 414 both of which are attached to the first end effector 304. The tail pusher 700 and tail flattener 414 have respective flanges 710 and 430 that contact each other. The lower surface 712 of the tail pusher's flange 710 presses against the upper surface 432 of the tail flattener's flange 430 so that the tail flattener 414 is necessarily raised when the tail pusher 700 is lowered.

Figure 8:
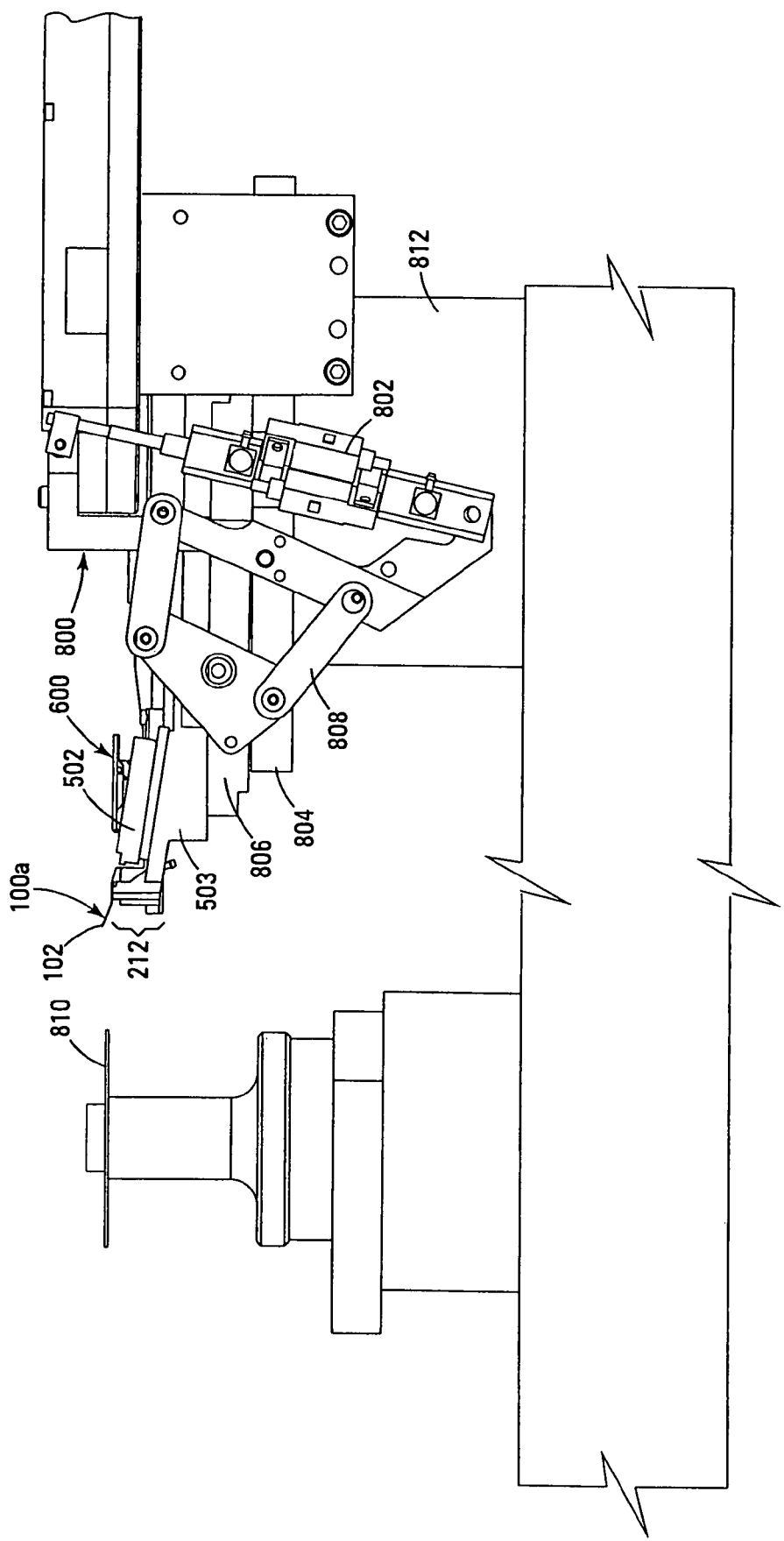
FIG. 8 is one embodiment of a four bar loader.

FIG. 8 shows the four bar loader (FBL) 800 that moves the HGA into position adjacent to the disc 810 for dynamic electrical testing of the HGA. The FBL 800 permits loading the head 102 to the disc 810 at a minimal pitch angle only limited by the HGA's geometry and may achieve various radius and skew angles. The FBL 800 includes a pair of plates; one, the fixed plate 804, is fixed parallel to the disc surface, the other, the pivot plate 806, is allowed to pivot using a four bar linkage 808. The pivot plate 806 is actuated with a tilt actuator 802 that connects the four bar linkage 808 and the pivot plate 806 to the fixed plate 804. The clamp wing assembly 600, pivot bracket 503, nest assembly 212, and fine positioner (not shown in FIG. 8) are attached to the pivot plate 806 and tilt with the FBL 800. The whole assembly is typically attached to a moving stage 812 to enable movement to and from the disc 810.

The FBL 800 enables positional accuracy and structural integrity. The pivot plate 806 is aligned to the fixed plate 804 using precise pins (not shown) allowing for very accurate locating tolerances for the HGA. When the HGA is tested, the pivot plate 806 may be clamped to the fixed plate 804 using a variety of techniques, including but not limited to a mechanical latch or latches or a vacuum pocket drawing the two plates together. This gives excellent rigidity and isolates the pivot mechanisms from contributing to positioning error during test. It is important that the FBL 800 position the HGA base plate 108 parallel to the disc during testing. To do this, the fixed plate 804 and the pivot plate 806 must be machined flat and parallel. In this way, the base plate 108 parallelism is not dependent upon assembly techniques or tolerances.

Actuation is achieved with the use of pneumatic cylinders, though other types of actuators could be implemented. Pneumatic cylinders can provide fast actuation at a low cost. Tilt velocity and end of travel impact is controlled with air pressure, flow controls, and dampers using conventional techniques. One alternative is to use servomotors, at a higher hardware cost, to provide more control of the tilt velocity.

In one embodiment, the described structures accomplish the steps occurring in the test area 206 in the following manner. The first end effector 304 moves the HGA 100a from the précising area 204 to a position above the test nest 212. It then lowers the HGA 100a onto the test nest 212 and presses it against the test nest 212. During this process, the HGA 100a maintains the alignment set on the précising nest 210.

Referring to FIGS. 5 and 5A, when the HGA 100a is lowered, the boss hole 110 slips over the extended fingers 504 of the collet assembly 500. In their extended state, the fingers 504 are contracted because the o-ring 506 pulls the fingers together and the spreader pin 512 does not exert pressure through the center of the four fingers when they are in the extended position. When the fingers 504 retract, the spreader pin 512 forces the fingers 504 open, and the fingers grab the base plate 108 and pull it down tight against the surface of the collet housing 514. As the fingers 504 pull down against the base plate 108, angled protrusions 509 on their respective tips 511 catch the angled surface 110a (FIG. 1A) on the inside of the boss hole 110 and pull the base plate 108 tight against the mounting area 524. This process permits the collet assembly 500 to hold the HGA without disturbing the alignment previously set on the précising nest 210.

The application of vertical force is controlled by air pressure. Referring to FIG. 5A, the pressurized air fills a lower space 518 which causes the piston top 508, retainer 510, and the fingers 504 to move up. Downward movement occurs when the pressurized air fills an upper space 520 and the air in the lower space 518 is permitted to exhaust to the ambient environment. The downward movement causes the fingers 504 to contact the spreader pin 512, which creates an outward pressure on the fingers 504 causing them to spread. In this way, the fingers are spread as they are lowered towards the surface of the collet housing 514 that serves as the HGA mounting area 524. To capture and hold the HGA 100a and maintain its precise alignment, the fingers 504 need to expand precisely the same amount of distance and with the same amount of force. With the small size of the collet assembly 500, the independent fingers 504 may permit a better dimensional consistency between the fingers than if the fingers were cut from a single piece of material.

The collet fingers 504 open up and then pull down, providing the required downward force with minimal radial force. There could be a variety of applications for the collet assembly 500, and its size may be scaled up or down depending on the size object to be secured. The pneumatics can be replaced with springs for actuation with a finger or other mechanical means. In the embodiment discussed herein, the collet assembly 500 is fabricated with four individual fingers with an o-ring to provide the retracting force. However, the individual fingers may be designed based on what size or type of HGA is being clamped. For instance, in a slightly larger scale, the collet could be one piece, where the fingers were flexures and provided their own retracting force.

After the collet assembly 500 has secured the HGA 100a to the mounting area 524, the HGA's flex circuit 112 is interconnected with the preamplifier's gold contacts 602 (FIG. 6A). The tail pusher 700 on first end effector 304 is actuated to move the HGA flex circuit 112 down on the gold contacts 602. Here, the tail pusher 700 helps align the flex circuit to the preamplifier's gold contacts 602 for interconnection. As shown in FIG. 7, when the tail pusher 700 is actuated downward, the tail flattener 414 moves up allowing clearance for the clamp wing 606. The tail pusher 700 also pushes the flex circuit 112 down so that the clamp wing 606 does not catch on the circuit 112 as it is actuated horizontally.

Referring again to FIG. 6A, after the clamp wing 606 is actuated above the flex circuit 112, it presses the flex circuit pads 118 (See FIG. 1A) against the gold contacts 602. The clamp wing assembly 600 may be necessary because making an automated electrical connection requires pulling the flex circuit 112 down against the gold block contacts 602 in a consistent manner. When pulling down the flex circuit 112, the circuit 112 first needs to be contacted near the HGA base plate 108, and pressed down with an even pressure over the length of the flex circuit 112. The clamp wing pins 614 on the front of the clamp wing 606 engage slots 505 on the pivot bracket 503, which may be mounted to the pivot plate 806. The clamp wing 606 is then actuated down against the flex circuit in a rolling motion, where the clamp wing pins 614 are engaged in the slots and the clamp 606 rotates in a downward circular motion around the axis created by the pins 614.

The clamp wing pad 608 is located under the clamp wing 606 and may be composed of compliant materials including electrostatic dissipative elastomers. The pad 608 is in line with the gold contacts 602 and applies a compliant force to the flex circuit pads 118 to press them against the gold contacts 602. The initial engagement of the pins 614 followed by the clamp wing's downward actuation allows the flex circuit 112 and pads 118 to float during the flattening out of the flex circuit 112, which helps remove a great deal of the flex circuit's 112 positional error. In this way, the clamp wing 606 presses and holds the HGA flex circuit 112 onto the preamplifier's gold contacts 602, which establishes a connection.

Additionally, when interconnecting the flex circuit 112 with the gold contacts 602 any positional errors of the flex circuit 112 must be corrected or compensated. Another way to overcome the positional errors of the flex circuit 112 is to make the area with the gold contacts 602 much larger than the flex circuit pads 118 that interconnect with the contacts 602. By using large flat gold contacts 602 with an area that covers the tolerance range of the flex circuit location, one may ensure that the gold contacts 602 and the flex circuit pads 118 contact each other when they are pressed together. This type of interconnect aids automation because it is very tolerant to positional flex circuit variation.

The compressive force may be applied to the flex circuit 112 nominally centered over contact pads 118 with a compliant material, such as the clamp wing pad 608, so that the force can overcome variation in the heights of multiple contacts as well the height differences of the flex circuit layers. The clamp wing pad 608 may be comprised of an array of posts. The size of the posts may be half the size of the of the contact pads 118 to ensure that at least one full post may press the contact pad 118 against the gold block 602. Using posts of this size maximizes the pressure of the contact pad 118 against the gold block 602 at a minimum overall force to compress the compliant pad 608. The reliability of the electric circuit may depend upon the pressure of the contact pad 118 against the gold block 602.

In other embodiments, a post with a smaller diameter may be used to increase the post density on the contact pad 118. Larger posts may also be used. Alternatively, ribs may be used instead of posts. The ribs may be alternating stripes of high and low regions of the clamp wing pad 608 that can make lines of contact across the width of the contact pads 118 when the compressive force is applied. In another embodiment, the clamp wing pads 608 may have a waffle pattern, where the there may be 2 patterns of ribs aligned perpendicular to each other to create a waffle pattern on the clamping wing pad 608. The waffle pattern clamp wing pad 608 may require a greater compressive force to achieve reliable contact between the contact pad 118 and gold block 602, but may have a lower manufacturing cost.

The clamp wing assembly 600 may make contact between the connector 616 described in FIGS. 6C-6E and the flex circuit pads 118 with a method similar to that described for the gold block 602. Additionally, when the clamp wing pad 608 applies compressive force to press the flex circuit pads 118 against the first end 624 of the connectors conductor 620, the first end 624 may deflect or bend. The deflection may be flush with the surface of the housing 618 that faces the pads 118 to ensure an adequate connection is established. Using an elastic material for the conductor causes it to oppose the force created by the clamp wing pad 608, and the greater the deflection of the conductor, the greater the opposition force. In turn, the opposition force can permit a reliable contact between the flex circuit pads 118 and the deflected conductor 620. The use of an elastic material in constructing the conductors 620 permits the conductor to return to substantially its original position after the flex circuit 212 is removed, so that the connector 616 may be used many times before it has to be replaced.

Once the HGA 100a is clamped by the clamp wing assembly 600 and its orientation is set, first end effector 304 releases HGA 100a and returns to the tray load/unload area 202 to pick up a second HGA 100b and moves it to the précising area 210, where the second HGA 100b begins the processes described for the first HGA 100a.

Figure 8A:
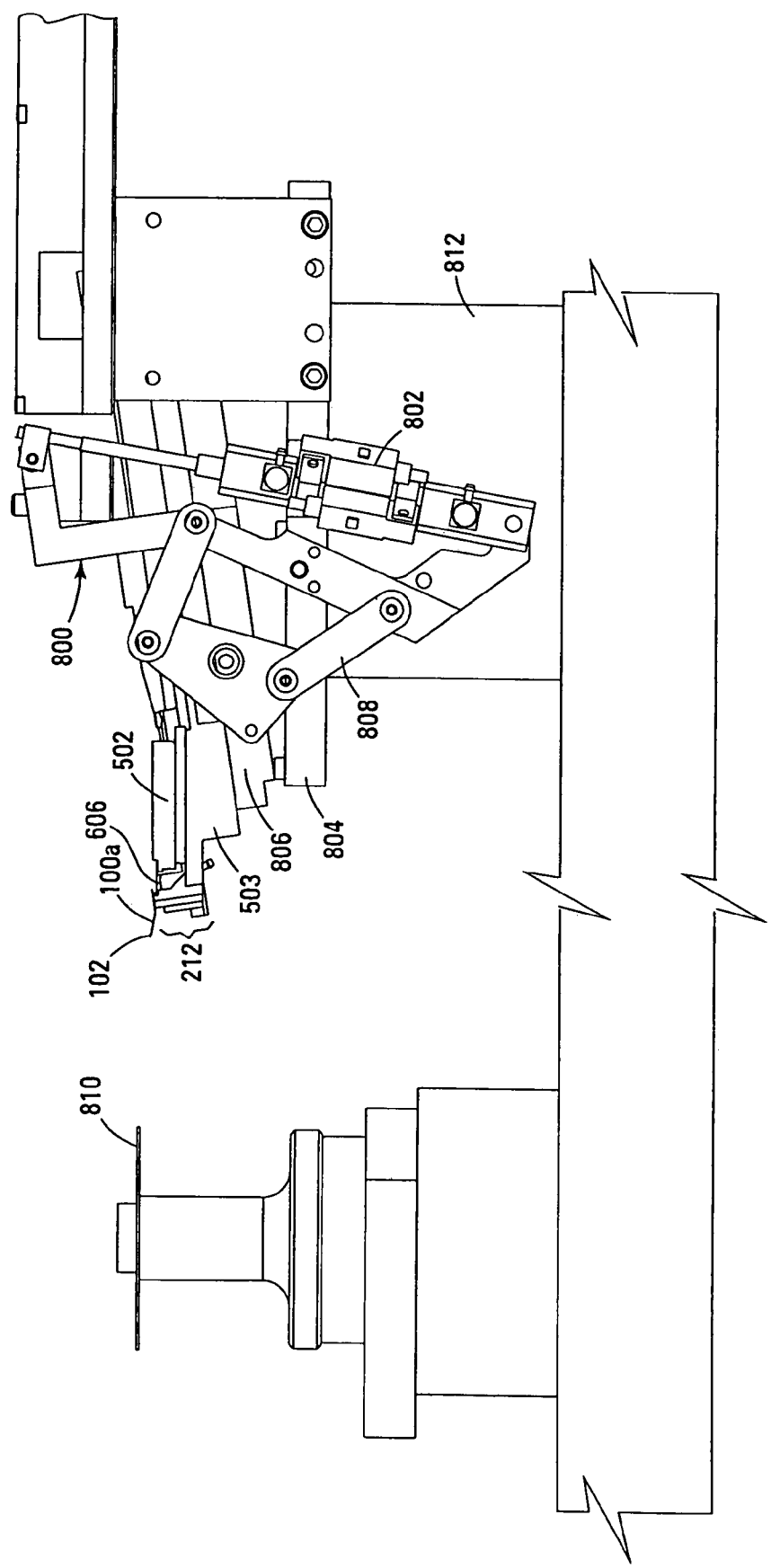
FIG. 8A is the device shown in FIG. 8 tilted below the disc in preparation for testing the HGA.
Figure 8B:
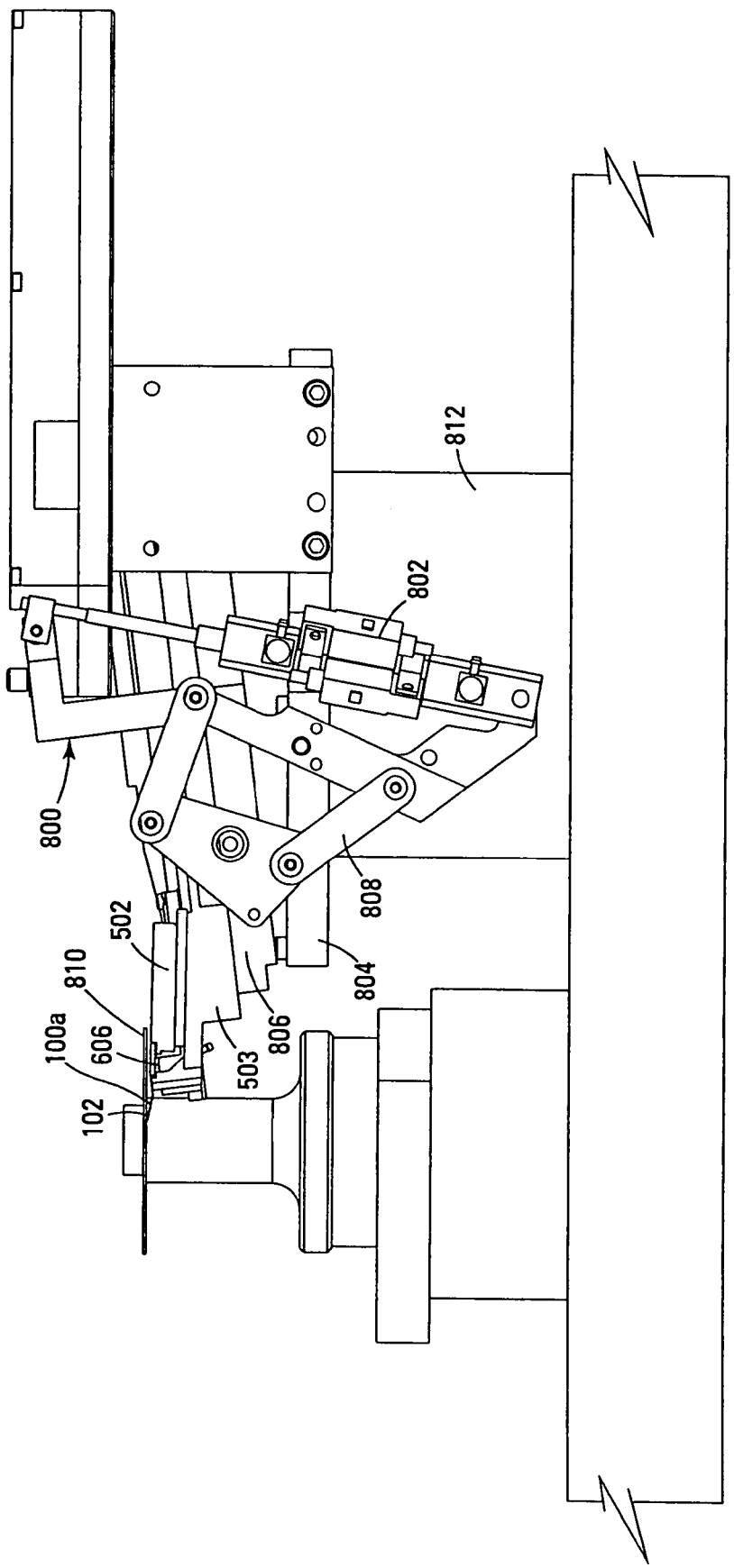
FIG. 8B is the device shown in FIG. 8 moved under the disc.
Figure 8C:
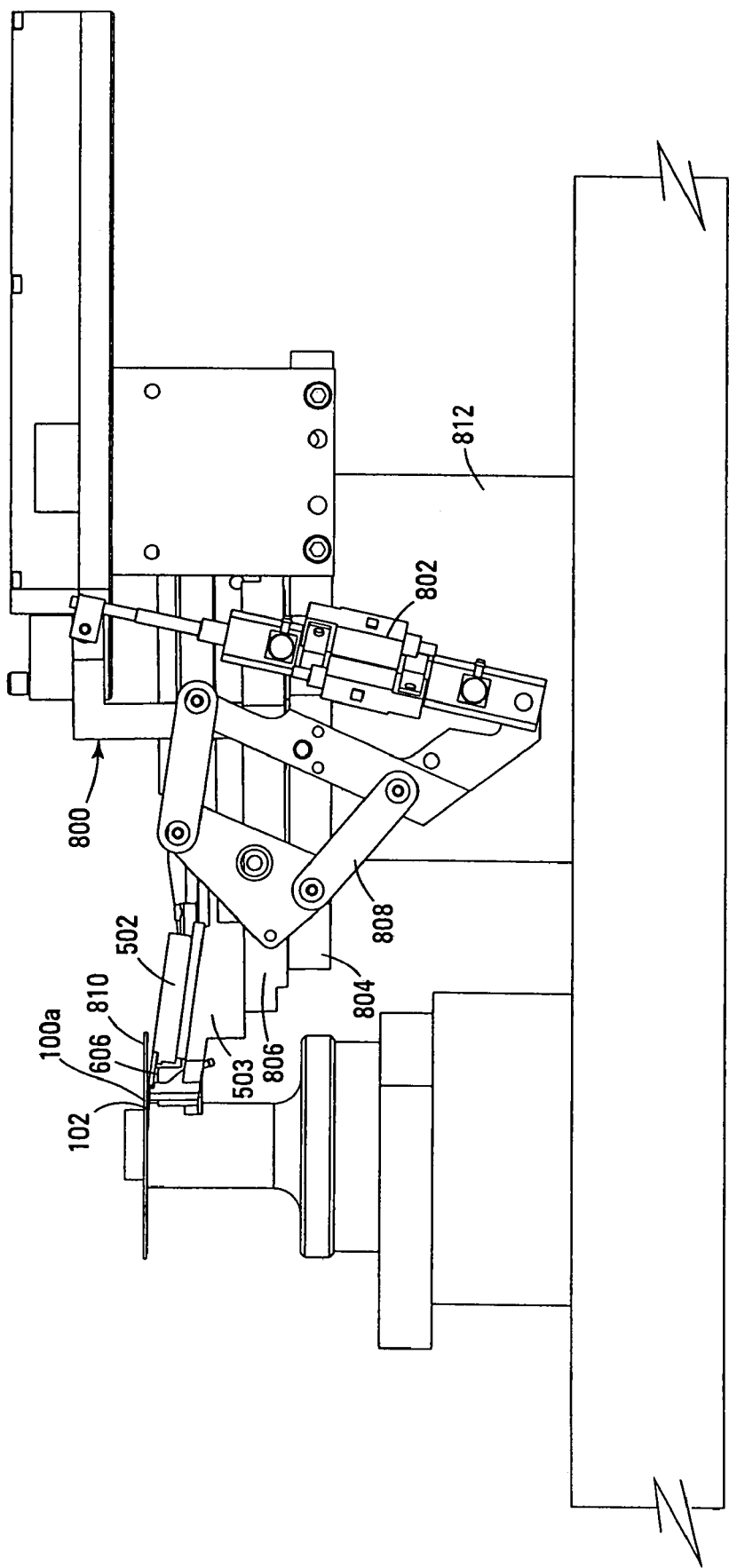
FIG. 8C is the device shown in FIG. 8 loaded to the disc.

As shown in FIG. 8, the FBL 800 is used to load the HGA 100a to the disc 810 while the second HGA 100b is picked from the tray load/unload area 202. Referring to FIG. 8A, the FBL 800 tilts the pivot plate 806 down relative to its position shown in FIG. 8 in order to move the HGA 100a below the surface of the disc 810. Next, as shown in FIG. 8B, the moving stage 812 on which the FBL 800 is mounted moves the HGA 100a to a load radius under the disc 810, and as shown in FIG. 8C, the pivot plate 806 is tilted up to a test radius. The HGA is then tested with the disc 810, and the results are read and analyzed by the UHGAT software. After the UHGAT performs the testing on the HGA 100a, the FBL's move stage 812, moves the HGA to an unload radius, the FBL 800 tilts pivot plate 806 down, and the FBL 800 returns to its original location.

Use of the four bar linkage 808 on the FBL 800 enables the projection of a hinge pivot point into space. Proper choice of linkage 808 enables putting a virtual pivot point near the bend of the load beam 104 (FIG. 1B). Additionally, as shown in FIG. 8C, the preamplifier assembly 502, including the contacts 602 is not located on the same plane as the base plate 108. Instead, they are on a plane sloped away from and below the plane of the base plate relative to the disc 810. In this position, the preamplifier assembly does not limit the loading of the HGA because it is not in a location where it could contact the disc. The projection of the pivot point and the location of the preamplifier's parts enable loading the HGA 100a with the head 102 at a very shallow angle that is only limited by the geometry of the HGA.

The FBL design may also be flexible. For instance, the linkages may be sized to locate the pivot where a wide range of HGA geometries can be accommodated. However, if a different style of HGA or HGA attachment mechanism is used, a simple change of the linkages can move the virtual pivot to a new optimum location.

After the HGA 100a has been tested, first end effector 304 moves the second HGA 100b from the précising area 204 to the test area 206, and the first HGA 100a is removed from the test nest 212 by the second end effector 308. The second end effector creates a vacuum force with the vacuum 320 (FIG. 3) to retain the HGA's base plate 108 on the bottom surface of second end effector 308 and the collet assembly releases the HGA 100a by extending the fingers 504 upward allowing the base plate 108 to slip over them. Then the second end effector 308 removes the first HGA 100a, and the first end effector 304 places the second HGA 100b on the test nest 212. Loading and unloading the HGAs to and from the test nest 212 takes less than 2.5 seconds, which is far faster than any manual operator.

The first end effector 304 and the second end effector 308 are then actuated back to the tray load/unload area 202 and the first HGA 100a is returned to the tray 300. If the HGA 100a fails, the electrical test the tray's RF tag can be marked to indicate the failure. The described process continues until all the untested HGAs are tested.

The first end effector 304 and the second end effector 308 are then actuated back to the tray load/unload area 202 and the first HGA 100a is returned to the to the tray 300. If the HGA 100a fails, the electrical test the tray's RF tag can be marked to indicate the failure. The described process continues until all the untested HGAs are tested.

Figure 9:
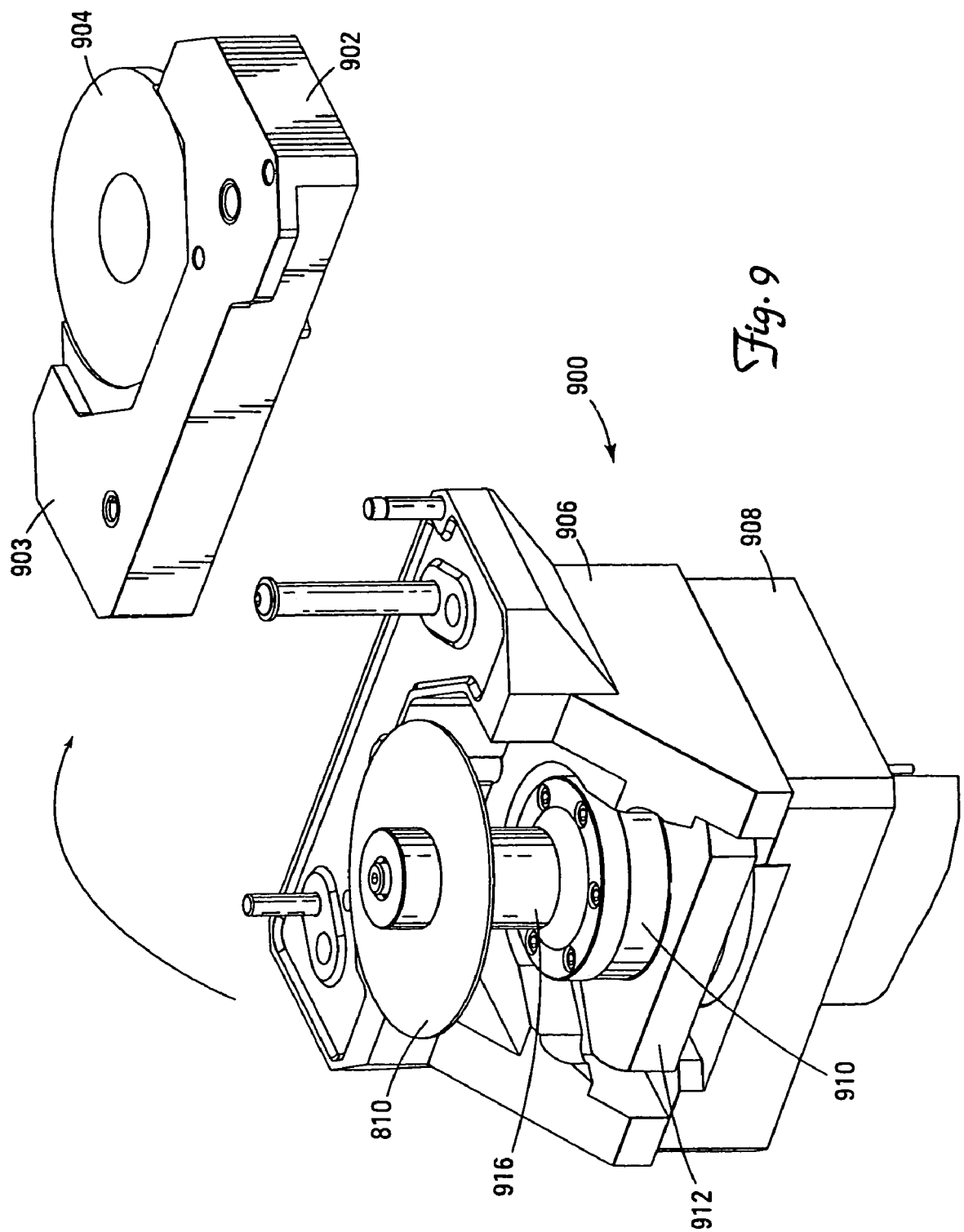
FIG. 9 is one embodiment of a disc flutter control device.

When testing the HGA with disc 810, an optional disc flutter control device 900 shown in FIG. 9 may be used to mitigate errors caused by disc flutter. Internal or external sources, such as internal spindle vibrations or external windage and acoustic vibrations, may excite the disc 810 and cause disc flutter. The flutter control device 900 reduces disc flutter by including a removable shroud 902 in close proximity to the disc 810. This feature provides a cushioning force and in effect operates as a stiff virtual spring that connects the disc 810 to the cover, which reduces the results of disc flutter including asynchronous radial runout.

FIG. 9 shows the optional disc flutter control device 900 in use with the disc 810. The removable shroud 902 is positioned so that the shroud's underside 903 is shown. The shroud 902 may be removed to permit convenient access to the disc adapter 916 when seating the disc 810 or when the surrounding structures require service. During operation, the circular portion 904 of the shroud 902 may be above the disc 810, which may require testing HGA heads on the bottom surface of the disc 810. In operating position, the shroud 902 is attached to a base 906, which is attached to a riser 908. A spindle motor 910 is also mounted to the riser 908 via a spindle mounting flange 912. The triangular spindle mounting flange 912 may be surrounded on two sides by the base 906. The side that is not surrounded faces the four bar loader 800 and provides the loader 800 access to the disc 810. A disc adapter 916 is attached to the spindle motor 910, and the adapter 916 holds the disc 810 for testing. The disc 810 may be placed on the adapter 916 by passing the disc's center aperture through the protruding portion of the adapter 916.

Figure 10:
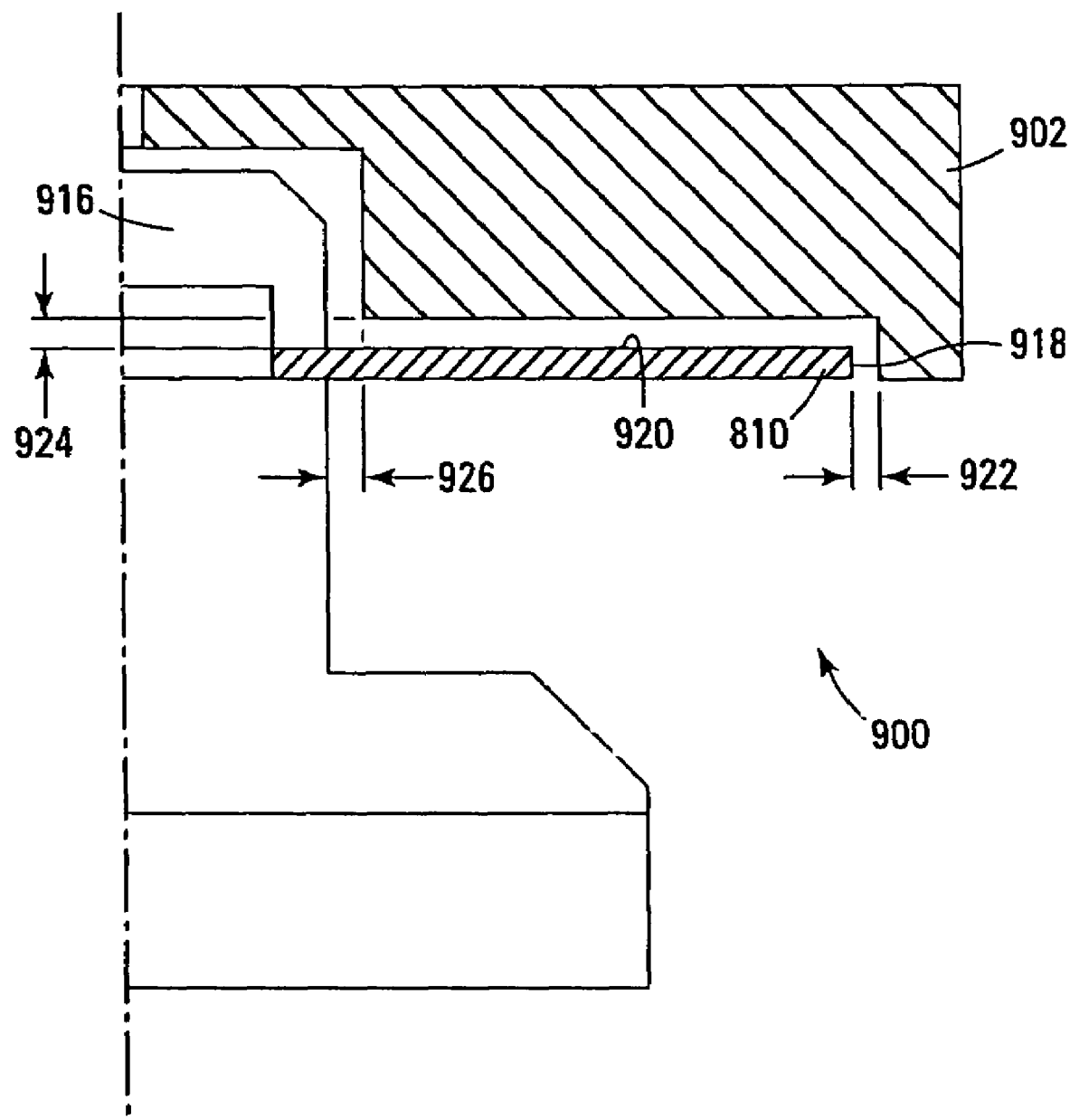
FIG. 10 is a section view of embodiment shown in FIG. 9.

FIG. 10 shows a section view of one half of the disc flutter control device 900. The figure illustrates the gaps between the structures, which define an air cushion between the disc 810 and the shroud 902. The side of the disc 810 that defines its outer circumference is the radial disc side 918, and the disc side that is perpendicular to the radial disc side and that faces the shroud 902 is the axial disc side 920. Correspondingly, the gap between the radial disc side 918 and the shroud 902 is the radial disc gap 922, and the gap between the axial disc side 920 and the shroud 902 is the axial disc gap 924. The gap between the side of the disc adapter 916 and the shroud 902 is the disc adapter gap 926.

Figure 11A:
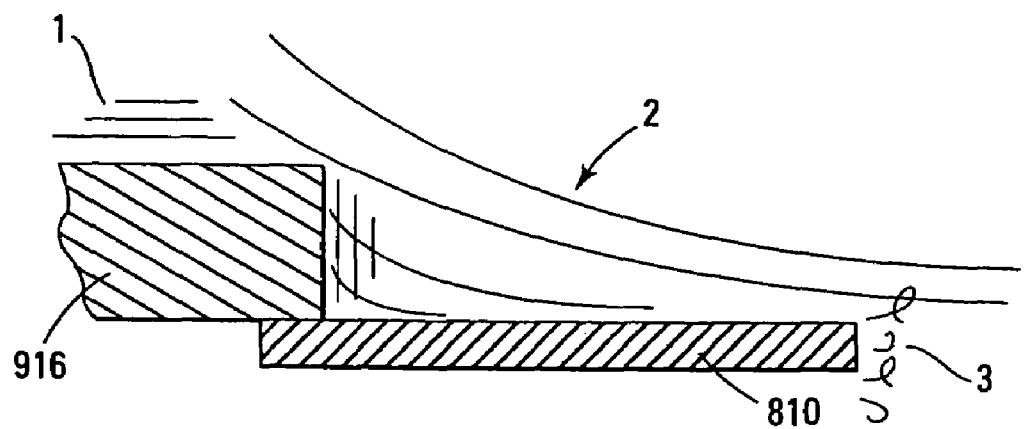
FIG. 11A is air flow over the disc without the disc flutter control device shown in FIG. 9.

Referring to FIG. 11A, when the spindle motor 910 rotates the disc 810, the motor 910 may create vibrations 1 that excite the disc 810 and cause disc flutter. In addition, air flow 2 around the disc 810, as well as turbulence 3 near the radial side 918 of the disc 810, create pressure variations and causes random structural excitation forces to be exerted on the disc 810, which in turn cause excitation of disc modes.

Figure 11B:
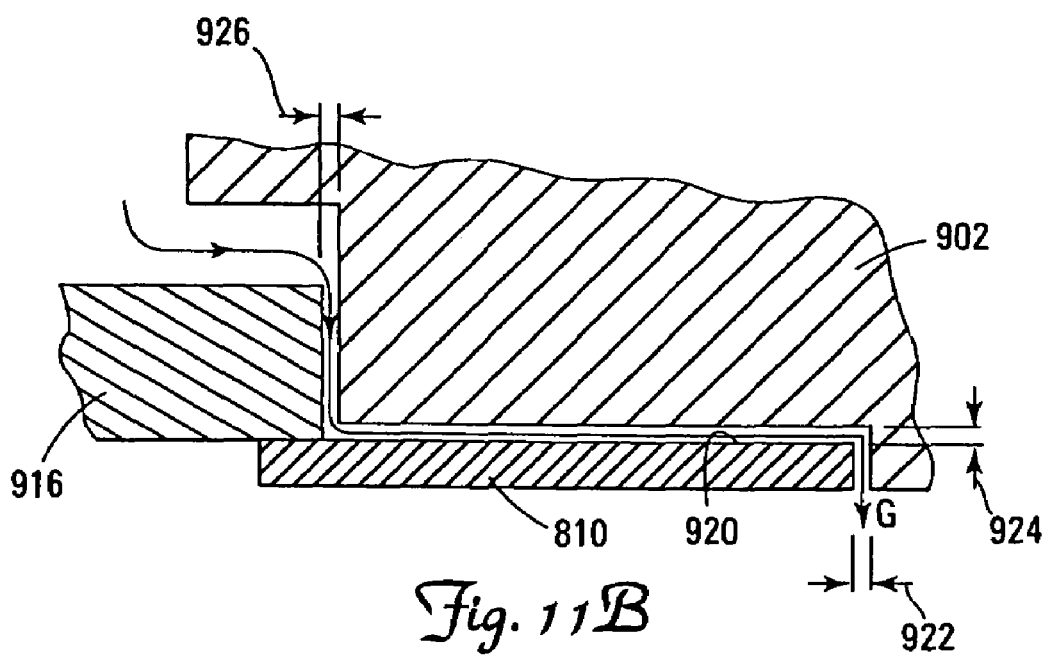
FIG. 11B is air flow over the disc with the disc flutter control device shown in FIG. 9.

However, as shown in FIG. 11B, the shroud 902 causes the air flow around the disc 810 to travel in the direction of arrow G. The small size of the gaps 922, 924, 926 reduce and smooth air flow near the disc 810. This reduced flow reduces turbulence near the disc 810, and the resulting reduced pressure against the disc reduces excitation of disc modes. The narrow gaps 922, 924, 926 create an air bearing that acts as a stiff virtual spring between the shroud 902 and the disc 810. The virtual spring constrains the movement of the disc 810 relative to the shroud 902, which reduces the amount of disc flutter in the disc 810 caused by spindle motor vibrations, which reduces spindle runout and improves the track per inch performance of the test system.

To create a stiffer virtual spring that provides a greater reduction in disc flutter, the axial gap 924 should be as small as possible without permitting contact between the shroud 902 and the disc 810. Moreover, the adapter gap 926 and the radial disc gap 922 also affect the disc flutter. A smaller adapter gap 926 substantially reduces the disc flutter present at the outer edge of the disc 810, while a smaller radial disc gap 922 substantially reduces the disc flutter present at the inner edge of the disc 810. By adjusting the thickness of each of the gaps 926 and 922, one can achieve uniform suppression of disc flutter at both the inner and outer disc edges.

FIG. 11B also illustrates a vacuum created by the spinning disc 810. In one embodiment, the vacuum draws external ambient air over the axial disc side 920 as shown by the arrows. In other embodiments, pressurized gas sources could provide the gas present in the gaps. The gas also could dynamically flow over the axial disc side 920 or remain in a static state in the gaps.

A number of embodiments of the invention have been described. Nevertheless, it will be understood that various modifications may be made without departing from the spirit and scope of the invention. Accordingly, other embodiments are within the scope of the following claims.

What is claimed is:

1. A method for aligning a head gimbal assembly comprising:
   providing an unmounted head gimbal assembly, wherein the head gimbal assembly comprises a first aperture and a second aperture;
   providing a computer controlled actuator;
   providing a surface defining an X-Y plane, wherein the surface comprises a first pin and a second pin;
   providing an alignment guide extending beyond the surface and along a Z-dimension perpendicular to the X-Y plane of the surface;
   moving with the actuator the head gimbal assembly along the Z-dimension and contacting the alignment guide to roughly align the head gimbal assembly with respect to the first and second pins; and
   moving the head gimbal assembly with the actuator in the Z-dimension to position the first aperture around the first pin and position the second aperture around the second pin.

2. The method of claim 1, wherein the actuator comprises a vacuum that holds the unmounted head gimbal assembly.

3. The method of claim 1, wherein the actuator comprises a pneumatic linear actuator.

4. The method of claim 1, further comprising deshunting the head gimbal assembly while the portion of the head gimbal assembly is on the surface.

5. The method of claim 1, further comprising:
   maintaining the alignment of the head gimbal assembly while transferring the head gimbal assembly from the surface to a location for electrical testing the head gimbal assembly.

6. The method of claim 5, further comprising:
loading the head gimbal assembly on a rotating disc; and
testing the head gimbal assembly by reading from and/or writing to the rotating disc.

7. The method of claim 1, wherein at least one of the first and second pins is tapered.

8. The method of claim 1, wherein the alignment guide comprises a first tapered portion on a first side of the surface and a second tapered portion on a second side of the surface.

9. A system for aligning a head gimbal assembly comprising:
a surface comprising a first pin and a second pin, wherein the surface defines an X-Y plane;
an alignment guide extending along a Z-dimension perpendicular to the X-Y plane; and
a computer controlled actuator that locates at least a portion of an unmounted head gimbal assembly on the surface, wherein the unmounted head gimbal assembly has a first aperture and a second aperture, and wherein the actuator moves the unmounted head gimbal assembly along the Z-dimension and against the alignment guide to roughly align the head gimbal assembly with respect to the first and the second pin on the surface, and wherein the actuator moves the head gimbal assembly further along the Z-dimension such that the first aperture is positioned around the first pin and the second aperture is positioned around the second pin.

10. The system of claim 9, wherein the actuator comprises a vacuum that holds the unmounted head gimbal assembly.

11. The system of claim 9, wherein the actuator is a pneumatic linear actuator.

12. The system of claim 9, further comprising:
a rotating disc; and
a four-bar mechanism that loads the head gimbal assembly on the rotating disc,
wherein the computer tests the head gimbal assembly by reading from and/or writing to the rotating disc.

13. The system of claim 9, wherein at least one of the first and second pins is tapered.

14. The system of claim 9, wherein the alignment guide comprises a first tapered portion on a first side of the surface and a second tapered portion on a second side of the surface.

* * * * *